(12) United States Patent
Koch et al.

(10) Patent No.: US 12,445,311 B2
(45) Date of Patent: Oct. 14, 2025

(54) MITIGATING FPGA RELATED RISKS

(71) Applicants: Technische Universität Darmstadt, Darmstadt (DE); Dirk Koch, Berlin (DE); Katholieke Universiteit Leuven, Leuven (BE); imec vzw, Leuven (BE)

(72) Inventors: Dirk Koch, Berlin (DE); Ahmad-Reza Sadeghi, Darmstadt (DE); Jo Vliegen, Leuven (BE); Shaza Zeitouni, Darmstadt (DE); Nele Mentens, Leuven (BE)

(73) Assignees: Technische Universität Darmstadt, Darmstadt (DE); Dirk Koch, Berlin (DE); Katholieke Universiteit Leuven, Leuven (BE); imec vzw, Leuven (BE)

( * ) Notice: Subject to any disclaimer, the term of this patent is extended or adjusted under 35 U.S.C. 154(b) by 159 days.

(21) Appl. No.: 18/505,546

(22) Filed: Nov. 9, 2023

(65) Prior Publication Data
US 2024/0073040 A1    Feb. 29, 2024

Related U.S. Application Data

(63) Continuation of application No. PCT/EP2022/062476, filed on May 9, 2022.

(30) Foreign Application Priority Data

May 9, 2021  (EP) .................................... 21172917

(51) Int. Cl.
*H04L 9/32*   (2006.01)
*G06F 21/51*  (2013.01)
*G06F 21/76*  (2013.01)

(52) U.S. Cl.
CPC ............ *H04L 9/3278* (2013.01); *G06F 21/51* (2013.01); *G06F 21/76* (2013.01); *G06F 2221/034* (2013.01)

(58) Field of Classification Search
CPC ....... H04L 9/3278; G06F 21/15; G06F 21/76; G06F 2221/034
See application file for complete search history.

(56) References Cited

U.S. PATENT DOCUMENTS 8,756,438 B2 * 6/2014 Devadas ................. G06F 21/31
                                                   713/1
10,104,096 B1 * 10/2018 Collins ............... H04L 63/0876
(Continued)

OTHER PUBLICATIONS

Written Opinion and International Search Report for PCT Application No. PCT/EP2022/062476, mailed on Sep. 6, 2022, 13 pages.
(Continued)

*Primary Examiner* — Gary S Gracia
(74) *Attorney, Agent, or Firm* — Brake Hughes Bellermann LLP

(57) ABSTRACT

A host computer with a FPGA is communicatively coupled to a configuration computer via a communication network. The host computer receives target configuration data from the configuration computer in encrypted form. A scanner module that is associated with the host computer decrypts the target configuration data and scans it for malicious code. The module writes the target configuration data to the fabric area of the FPGA and thereby configures the FPGA accordingly, to enable execution of a target array application. The scanner module is associated with the host computer by being implemented as trusted execution environment, or as an on-array-processor.

16 Claims, 12 Drawing Sheets

(56) References Cited

U.S. PATENT DOCUMENTS

| | | | | |
|---|---|---|---|---|
| 10,353,834 | B2* | 7/2019 | Chandra | G06F 13/1668 |
| 11,954,208 | B1* | 4/2024 | Grass | G06F 21/76 |
| 12,050,688 | B1* | 7/2024 | Lameres | G06F 21/566 |
| 2006/0209584 | A1* | 9/2006 | Devadas | G06F 21/445 |
| | | | | 365/52 |
| 2012/0047371 | A1* | 2/2012 | Woodall | G06F 21/76 |
| | | | | 713/189 |
| 2015/0012737 | A1* | 1/2015 | Newell | G06F 21/44 |
| | | | | 713/2 |
| 2018/0157464 | A1* | 6/2018 | Lutz | G06F 9/3001 |
| 2018/0270068 | A1* | 9/2018 | Innis | H04L 63/105 |
| 2019/0095113 | A1* | 3/2019 | Atsatt | G06F 15/7892 |
| 2019/0272215 | A1* | 9/2019 | Olarig | G06F 3/064 |
| 2020/0097659 | A1* | 3/2020 | Olarig | G06F 21/79 |
| 2020/0274921 | A1* | 8/2020 | Pope | H04L 49/3072 |
| 2020/0342112 | A1* | 10/2020 | Plusquellic | G06F 21/602 |
| 2021/0144517 | A1* | 5/2021 | Guim Bernat | G06F 9/5072 |
| 2021/0365592 | A1* | 11/2021 | Rabbani | G06F 1/04 |
| 2024/0073040 | A1* | 2/2024 | Koch | G06F 21/56 |
| 2025/0055681 | A1* | 2/2025 | Ince | G06F 21/602 |

OTHER PUBLICATIONS

Elrabaa, M.E.S et al.: "Secure Computing Enclaves Using FPGAS", IEEE Transactions on Dependable and Secure Computing, IEEE Service Center; vol. 18, No. 2; Aug. 6, 2019, pp. 593-604.

Khan, N. et al.: "Utilizing and Extending Trusted Execution Environment in Heterogeneous SoCs for a Pay-Per Device IP Licensing Scheme", IEEE Transactions on Information Forensics and Security, vol. 16, Feb. 11, 2021, pp. 2548-2563.

Eguro, K. et al.: "FPGAs for Trusted Cloud Computing", 22nd IEEE International Conference on Field Programmable Logic and Applications, 2012, 8 pages.

Duncan, A. et al. "SeRFI: Secure Remote FPGA Initialization in an Untrusted Environment", IEEE 38th VLSI Test Symposium (VTS), 2020, 6 pages.

Zhao, M. et al.: "FPGA-Based Remote Power Side-Channel Attacks", IEEE Symposium on Security and Privacy, 2018, 16 pages.

La, T. et al.: "FPGADefender: Malicious Self-Oscillator Scanning for Xilinx UltraScale+ FPGAs", ACM Trans. Reconfig. Technol. Syst., vol. 13, No. 3, Article 15, Sep. 2020, 31 pages.

Hong, B. et al.: "Fasten: An FPGA-based Secure System for Big Data Processing", IEEE Design & Test, 2017, pp. 30-38.

* cited by examiner

MITIGATING FPGA RELATED RISKS

CROSS-REFERENCE TO RELATED APPLICATIONS

This application claims priority to, and is a continuation of PCT/EP2022/062476, filed on May 9, 2022 and entitled "MITIGATING FPGA RELATED RISKS," which in turn claims priority to EP Application No. 21172917.3 filed on May 9, 2021, both of which are hereby incorporated by reference in their entireties.

TECHNICAL FIELD

In general, the disclosure relates to the implementation process for data or signal processing applications partly or completely with field programmable gate arrays (FPGA), and, more in particular, relates to mitigating security risks and other risks that may occur for such FPGA implementation processes.

BACKGROUND

The skilled person can implement processing applications—in the broadest sense applications such as for processing data or signals—by a variety of devices types, among them
- computers, the combination of hardware (such as processor CPU, memory MEM) and software (such as operating system OS and application APP),
- application-specific integrated circuits ASIC, hardware adapted to the application, and
- field programmable gate arrays FPGA.

Implementing the processing application at least partly by a FPGA may be advantageous. Ideally, the FPGA would be as flexible as the computer and would operate as fast as the ASIC.

Implementing the processing application by a hybrid arrangement may be further advantageous. The processing application could be split to
- a computer application on the computer and
- a FPGA application (or "array application" in short).

Such an approach may allow accelerating the overall performance of the processing application, for example when calculation-intensive actions are delegated to the array application. For example, a processing application for processing images can be divided into
- user-interaction running on the computer (i.e., the computer application) and
- image-classification by a neural network running on the FPGA (i.e., the array application).

A FPGA is a hardware circuit comprising multiple elements and electrical connections between the elements. The appearance of the circuit area invites the skilled persons also to call it "fabric" or "fabric area". The elements (or "primitives") in the fabric area can be digital elements such as gates or other logic blocks (AND, OR, XOR, NO), flip-flops (FF), multiplexers (MUX), adders (ADD), bit shifters (SHIFT), lookup tables (LUTs), input/output elements (I/O), elements with predefined functionality for particular purposes, such as to decrypt keys, as dedicated hardware elements or configured elements, or processors or microcontrollers (again as dedicated hardware elements or being configured elements, "soft processor").

The elements (and the connections) are configurable. For example, the configuration of a logic block determines it to operate as AND-gate, OR-gate or otherwise. The configuration of a connection lets it conduct electrical current or act as isolator.

FPGAs are well-known in the art and have been described by a variety of public documents.

The elements can also be analog elements such as signal amplifiers or the like. In case that analog elements are configured by digital signals, the approach applies likewise. Although FPGAs are signal processing devices (based on semiconductors) that can process signals in digital and analog form, it is convenient to simplify the following discussion to the use of FPGAs for digital data processing.

From a high-level perspective, humans operate the FPGA as being their users. Occasionally, the users form groups or teams, especially when they share common data processing objectives. The users can act in different roles, with the possibility for the same person to act in different roles. However, distributing role performance to different users is rather the standard. Such distribution is potentially one cause of security risks and other risks.

The following special properties of FPGAs deserve special attention:
- Before performing the array application, the FPGA needs to receive configuration data. Receiving re-configuration data is possible and frequently applied.
- More than two array applications can run on the same FPGA separately, but they may influence each other, and some array applications may even destroy the FPGA. An application running on the FPGA could also influence computer applications running on the CPU that is powered from the same source as the FPGA.

These FPGA properties make the mentioned risks even more difficult to address.

From an overall perspective, configuration data is exposed to potential attackers:
- Attackers may intercept the configuration data on their way to the FPGA. These attackers may act as pirates that copy configuration data into their own array applications (for their own use).
- Attackers may modify (or create) configuration data to eventually mis-use array applications. These attackers may inject configuration data with malicious code to the FPGA. (Malicious code can be injected in the form of viruses or worms, or other malware.) The FPGA would potentially interact with co-running arrays application in an undesired way and/or to negatively influence the performance of the FPGA otherwise.

There is a need to provide technical measures that mitigate these risks.

SUMMARY

From an overall perspective, the solution belongs to a process for remotely configuring an FPGA that has been installed previously on a host computer. During the configuration process, the host computer is communicatively coupled via a communication network to a configuration computer. The configuration computer is located remotely from the host computer. The process results in an array application that is ready to run on the FPGA. There are two main aspects for this process: (i) the configuration data for the FPGA arrives at the FPGA in encrypted form, and (ii) the configuration data arrives at a scanner module in encrypted form as well.

From an overall perspective, the process mitigates risks by protecting the configuration data against intercepting and mis-use. The process thereby enhances the security.

The scanner module checks the absence of malicious code in the configuration data. The scanner module is related to the particular FPGA instance. It can be implemented in two alternatives:

In the first alternative, the scanner module is related to the FPGA by being implemented by the processor of a computer that is associated with the FPGA, the computer being the "FPGA associated computer". The FPGA associated computer can be the host computer or can be a further computer (the "support computer"). The FPGA associated computer operates with a trusted execution environment (TEE).

In the second alternative, the scanner module is related to the FPGA through its implementation by a processor that is physically located on the FPGA and that executes a scan application. In other words, that processor could be called "on-FPGA-processor" or "on-array-processor" in short.

There are at least two ways to implement this on-array processor, simplified in hardware and in software.

In a first option (of this second alternative), the on-array-processor comprises one or more processor cores that are embedded to the FPGA.

In a second option (of this second alternative), the on-array-processor comprises a part of the fabric area that is configured to operate like a processor (called "soft-processor")

The separation into options is convenient for explanation, but combinations are possible (some functions by the embedded core, some functions by the fabric).

More in detail, there is a particular configuration computer and a particular FPGA paired in advance, and the process involves the combination of two sub-processes:

The particular configuration computer sends configuration data (TARGET_CONFIG) to the particular FPGA instance via a network and via the host associated computer, in encrypted form [TARGET_CONFIG]. A function within the FPGA associated computer (or within the FPGA) can decrypt the data and configure a target array application.

A scanner module implemented by the TEE of the FPGA associated computer (or implemented by the on-array-processor) checks the configuration data for the absence of malicious code.

The configuration data needs to be decrypted in advance of the scan, [TARGET_CONFIG] to TARGET_CONFIG.

The availability of non-encrypted configuration data TARGET_CONFIG on the FPGA associated computer may create the further risk of interception of the configuration. The FPGA associated computer therefore processes TARGET_CONFIG in the TEE only (e.g., in an enclave).

During the process to configure the FPGA, hardware will be combined with software (i.e., configuration data that defines the array application). Hardware and software have different sources. Simplified, the sources are:
the manufacturer, and
the configuration computer.

The process involves (at least in preceding activities) physical re-location of the hardware, the FPGA will be physically installed to a host computer, and
the non-physical communication of the configuration data through a network to the FPGA via the host computer.

Such activities involve risks. The risks can be differentiated into two groups. There are hardware-related risks (such as pre-configuring the hardware with malicious code) and software-related risk (such as intercepting the communication of the software to the FPGA, with privacy and integrity concerns, as well as introducing malicious code).

Encrypting the configuration data (at least during communication) is a traditional approach. However, it would require measures such as pre-installing keys or the like to the hardware or to communicate keys in a secure manner.

The process (that is described herein) can use challenge response functions (CRF): particular FPGA instances react on challenges differently. The interaction with hardware allows the configuration computer to derive a key (to encrypt the configuration data before communication), and allows the FPGA itself to derive the same key (to decrypt the configuration data after communication).

Such an approach would require logistics, such as of enablement of the configuration computer to obtain the key and the enablement of the FPGA to derive the key.

Since attackers would interfere with the logistics as well, the approach can use further data protection, such as communicating the CRP in modified formats, calculating hash values, introducing nonce values (to use only once). Further, the approach implements logistics by an auxiliary array application (to be installed first to the FPGA) in combination with authentication (the FPGA authenticates the configuration user, and vice versa).

Optionally, the approach can use such measures (in a synergistic way) to address further risk (such as the risk of configuration data with malicious code).

There is also a computer program product that—when loaded into a memory of a computer and being executed by at least one processor of the computer causes the computer to perform the steps of the method steps. The instructions of the computer program (product) do not have to be specific to a general-purpose computer. An FPGA can perform some or all method steps as well. There is a variation in the terminology: "instructions" correspond to the "configuration" of an FPGA. In that sense, the computer-implemented method and the program product that are introduced herein can also be understood as an FPGA-implemented method and as an FPGA program product.

DETAILED DESCRIPTION

Writing Convention

In implementations, the process for remotely configuring an FPGA is performed in environments with multiple physical items, such as computers and FPGAs. The identification of item instances is related to security topics such as the authentication, integrity verification and so on. The description frequently writes references in the notation XXX-Y, with XXX referring to an item in general and Y referring to a particular instance of the item.

Variables in formulas are frequently noted as VARIABLE_INDEX.

Overview

Figure 1:
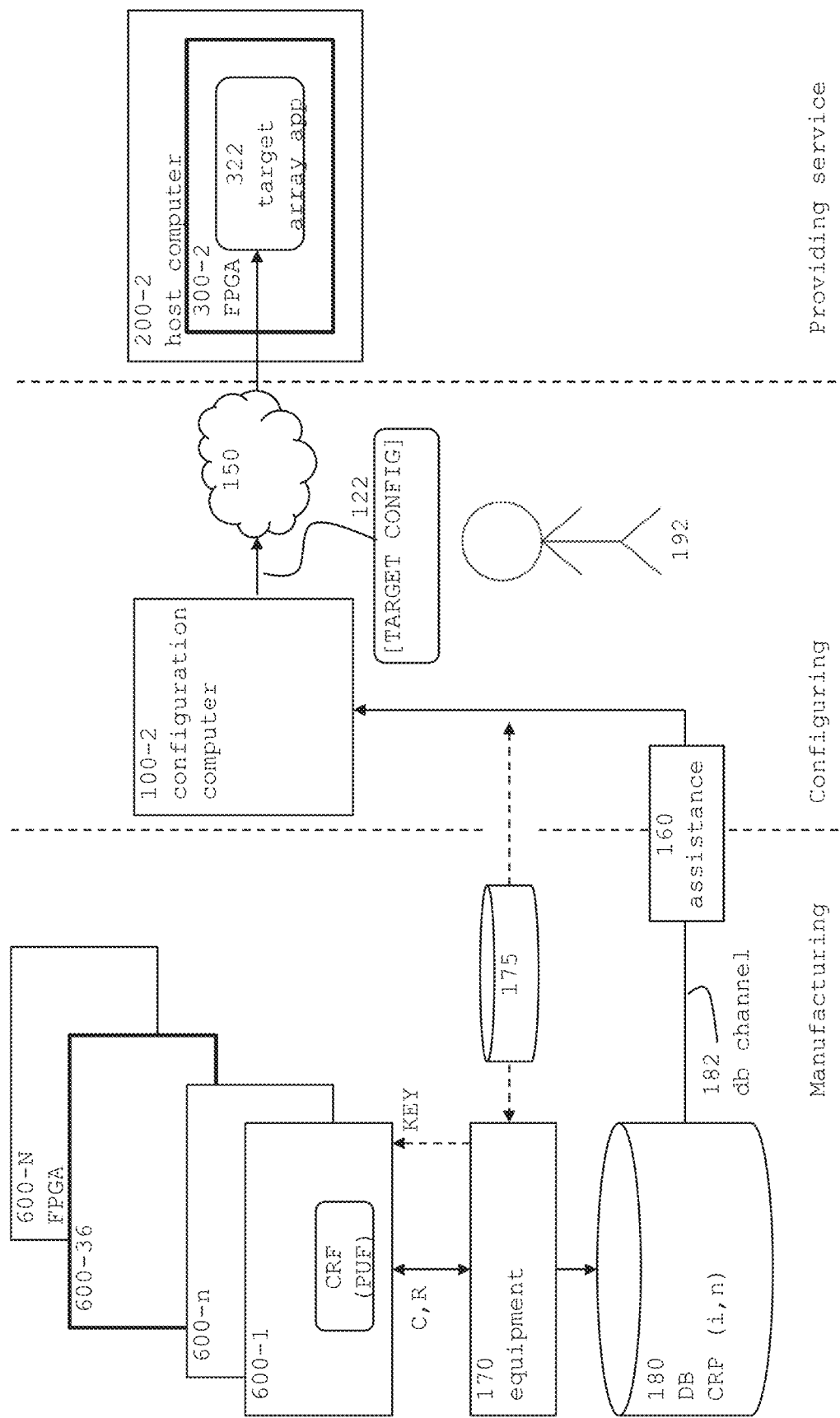
FIG. 1 gives an overview to a process that results in a target array application that is ready to run on the FPGA.

FIG. 1 gives an overview to the process that results in target array application 322 that is ready to run on FPGA 300-2.

The left side of the figure illustrates a plurality of FPGA instances 600-1 to 600-N. The figure differentiates the instances by integers from 1 to N. For simplicity, the description assumes that the manufacturer of the FPGA uses the 1 to N scheme as manufacturing numbers (or serial numbers). For example, the notation 600-$n$ stands for the FPGA instance with manufacturing number n.

The right side illustrates that the particular FPGA instance 600-36 is physically being installed on host computer 200-2 (then referred as FPGA 300-2), and subsequently being configured with target array application 322. Target array application 322 on FPGA 300-2 enables host computer 200-2 to perform the processing application (e.g., by accelerating image-classification).

Target array application 322 does not occupy the fabric area of FPGA 300-2 completely. Application 322 only occupies a particular region of the fabric (i.e., the target application area). As used herein, target configuration data 122 configures target array application 322 on the application area (of the overall area, but not the complete area). In other words, configuration data 122 is partial configuration data because it configures the FPGA only partially.

During configuration, FPGA 300-2 receives configuration data 122 via network 150 from configuration computer 100-2 (optionally operated by configuration user 192). In view of the potential attackers, configuration data 122 is encrypted (noted as [TARGET_CONFIG]).

As illustrated on the left side, technical equipment 170 interacts with a challenge response function (CRF) in each FPGA instance separately. Thereby, equipment 170 sends challenge C (i, n) to FPGA instance n and receives response R (i, n) from n. Both C (i, n) and R (i, n) form a challenge response pair CRP (i, n).

There are at least two options to implement such a CRF: In the first option, the CRF can be a physical unclonable function (PUF). In the second option, the CRF is a manufacturer-defined function (MDF).

The PUF option is based on manufacturing variations (that the manufacturer can't control). Semiconductor manufacturing involves a lot of chemical processes, and the FPGA instances therefore show minor variations in physical dimensions or in other properties.

To name only one variation by way example, the FPGA instances are slightly different in their electrical behavior: when electrical power is supplied, some FPGA elements (such as registers) will have logical values that are typical for the particular FPGA instance n. Such logical values can be processed by a PUF that is installed on each FPGA.

Usually, such variations do not matter, because the elements will process data that they receive and the power-on-values will be overwritten.

The MDF option can be based on secret data and a cryptography function to implement a session key derivation algorithm. For example, this can be implemented by burning secret data to special registers or other locations that can not be modified later, in analogy to vehicle serial numbers in automotive industry.

However, repeating the execution of the PUF/MDF leads to the same results. The approach takes advantage of that.

Equipment 170 repeats this interrogation (for each FPGA 600-$n$) to obtain a plurality of CRP (1, n) to (I, n). Equipment 170 forwards the CRP (i, n) to database 180. Simplified, the interrogation results in a CRP matrix, with I pairs for N FPGAs.

In theory, the approach uses a relatively low number of CRPs (for a single user), and the description identifies C, R and CRPs by indices i and i+1. Due to the selection (one FPGA 300 from N FPGAs 600), index n will be left out for most of the description. In practical implementations, there could be much more CPRs, for different users.

Configuration user 192 (or rather configuration computer 100-2) has (at least partial) access to database 180 for $C\_i+1$, and can use $C\_i+1$, and other data derived from that (i.e., from $C\_i+1$), to obtain the decryption key. The figure symbolizes the access as database channel 182 (between database 180 and configuration computer 100-2).

Assistance Function

At the border between the manufacturer and the configuration computer, the figure illustrates assistance function 160. The function is provided optionally. This computing function can be implemented by a computer under control of the manufacturer, or under control of a different party. Simplified, assistance function 160 has two aspects:

It derives data for particular CPRs (in database 180) so that configuring user 192 is shielded from other CPRs (security measure).

It provides a library of configuration data for a so-called auxiliary array application to be configured to run on FPGA 300-2 later (cf. FIG. 2 and FIG. 5). The auxiliary array application supports the configuration of target array application 322.

Illustrating assistance function 160 as a single block serves merely for simplicity.

It may be advantageous that the auxiliary array application is decoupled in time from manufacturing the FPGAs 600. In case of "bug-fixes" or the like, the auxiliary array application can be updated at substantially any time. The auxiliary application need to be available when the configuration of the target array application starts. Up-to-date applications can be available even for FPGAs that have been previously installed on host computers even years ago.

Taking Advantage of the FPGA Identity

Due to the physical identity (i.e., FPGA 600-36 is physically the same as FPGA 300-2), the challenge response pairs CRP remains available even after installation to host computer 200-2 (or to any other computer). The CRF operates with the same results. The responses $R\_i$ and $R\_i+1$ (and potentially others) will be available within FPGA 300-2 as well. Therefore, FPGA 300-2 can retrieve a decryption key (without exposing the key to the host computer). A different FPGA instance would not retrieve the same response (and not the same key).

Illustrative Example for the CRF

In a simplified example, FPGA instance 600-1 would perform the CRF and the register value would be V=0101, wherein the register value for instance 600-2 would be V=0011. The values do not have to be exposed to outside the FPGA. This is convenient and reduces the risk that the register values are intercepted.

FPGA 600-1 to 600-N have their own register values from V_1 to V_N, respectively. There is an assumption that the register values are different (due to the mentioned manufacturing variations). The illustrative example refers to a simplified CRF that would multiply the challenge C with the register value V and would return R=C*V.

For example, instance 1—if challenged by C=0010—would return R=1010 (because 1010=0010*0101). The CRP for instance 1 would be (0010, 1010). The manufacturer would repeat the interrogation with further challenges to collect further responses.

Instance 2—if challenged with C=0010—would return R=0110, leading to CRP=(0010, 0110).

The example is simplified for illustration, the skilled person would apply numbers with much more digits (for challenges and responses, from 128 bits to 256 bits or even more) and would use more complicated calculations (to obtain responses in form of hash values or the like).

Authentication

In an authentication process, a computer sends a challenge C to a particular instance and receives a response R from that instance. The instance can therefore be authenticated as the FPGA having a particular manufacturing number n if challenge C and response R match CRP (from database 180).

For example, the interrogation of instance 1 receiving C=0010 would be positive (R=1010 as expected), but the interrogation of instance 2 receiving the same C=0010 would be negative (R=0010*0011=0110 not as expected)

Equipment and Database Logistic

At the end of each manufacturing line, semiconductor manufacturers perform pre-defined tests to their products. There is no exception for FPGAs. The manufacturers would therefore include the functionality of equipment 170 into its testing facility (usually part of the semiconductor fabrication plant).

It is therefore convenient to assume the operation of equipment 170 and database 180 by the manufacturer (or maker) of the FPGAs.

Locations, Trust and Functions

Dashed vertical lines divide FIG. 1 to illustrate not only different physical locations and different functions, but also illustrate the "borders" between different trust zones:

The manufacturer has the function to manufacture the FPGA and—in the example—to obtain the CRP.

The configuration user (with the configuration computer) has the function to configure to FPGA.

The service provider has the function to operate host computer 200-2 (and other computers, cf. FIG. 8) and to install FPGA 300-2 on host computer 200-2.

In some implementations (cf. FIG. 8), host computer 200-2 belongs to a set of further computers in the so-called "cloud" so that the service provider would be the cloud service provider (or CSP).

It may be advantageous that there is no encryption/decryption key exchange required across the zone borders (between manufacturer and configuration user, and further to the service provider). This is at least applicable for keys that protects the FPGA configuration.

The operator of database 180 (i.e., the manufacturer in most cases) does not have to communicate CRP (i, n) and CRP (i+1, n) in plain form (i.e., not encrypted), but can use derivatives (in form of hash values or the like).

Nevertheless, as a further security measure, communication between different parties (here "across the borders") would use a secure communication link (that involve protocols with further keys).

Manufacturer-Added Data or Programs

The manufacturer can use equipment (such as equipment 170) to add data to each FPGA 600 such as
 to add identification numbers (e.g., manufacturer-number n), and/or
 to add authentication and decryption keys (specific to instance n).
 to vary physical properties (cf. the MDF), add secret data used for the MDF (as explained above).

The figure illustrates key database 175 with access to equipment 170 (or similar equipment) and—across the trust border—a distribution link to configuration user 192. Of course, the manufacturer would restrict the access to such data by keeping most of the data secret. It may be advantageous that the use of such manufacturer-added keys can be avoided, as it will be explained.

It is also possible that the manufacturer adds an initial configuration (to each instance n, with or without differentiating instances, such as boot programs, programs that act as de facto firmware or operating system, or other programs that assists in configuring the FPGA. But as it will be explained, such programs are not required.

Predefined functionality can be set by the manufacturer as well. For example, the manufacturer can provide a function to decrypt data (such as configuration data) according to the Advanced Encryption Standard (AES-128 or AES-256). Such functionality can be provided in hardware (already mentioned) or in software (such as by predefined configurations). The manufacturer can also add a key (for that AES function), but as it will be explained, adding the key may create a further risk.

Having given the overview, the description now focusses more on the service provider with the host computer (right side).

Figure 2:
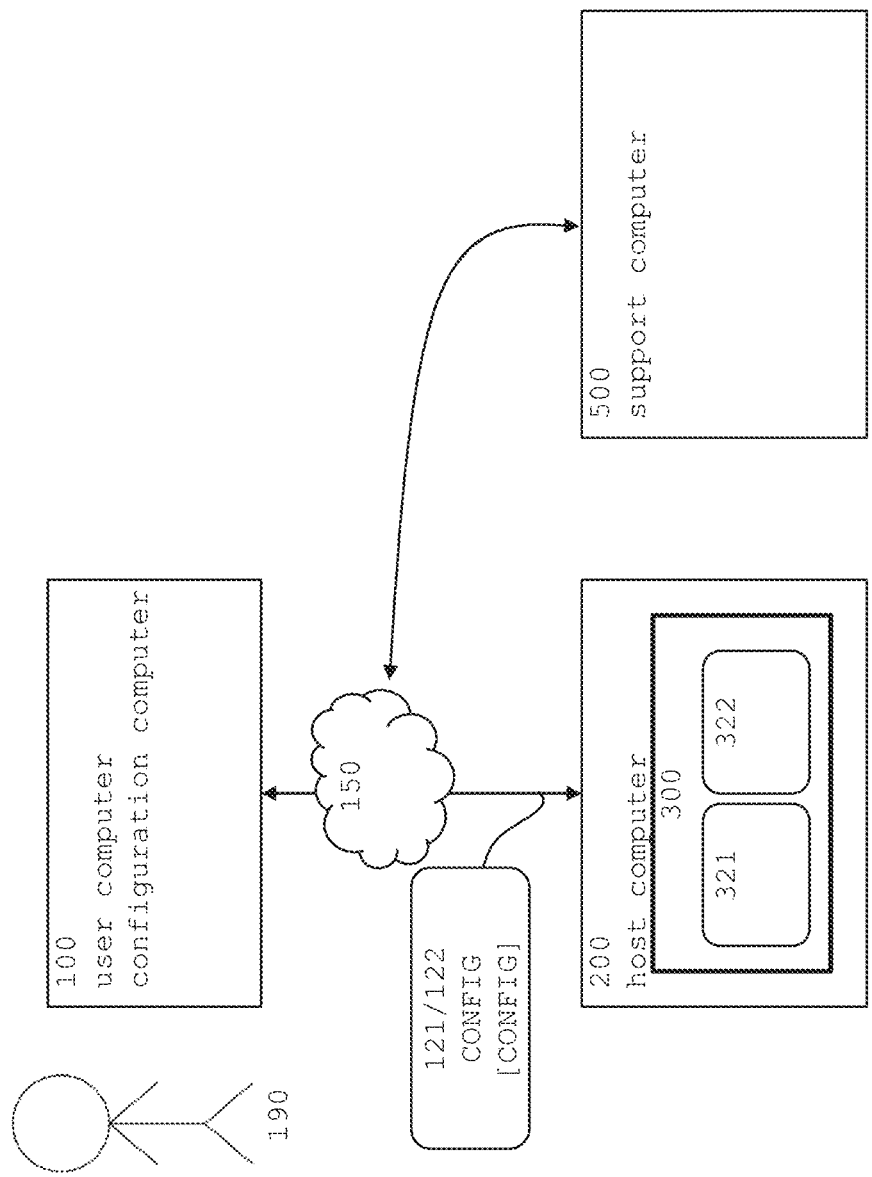
FIG. 2 illustrates a computer system with a user computer, a network, a host computer, and a support computer.

FIG. 2 illustrates a computer system with user computer 100 (frequently in the function of the "configuration computer"), network 150, host computer 200, and support computer 500. Particular instances are not differentiated.

Host computer 200 hosts FPGA 300. In implementations, FPGA 300 could be mounted on a printed circuit board (PCB) that is attached to the main board of host computer 200 via an interface (Peripheral Component Interconnect PCI, PCI express, etc.). The interface is well-known in the art. Host computer 200 itself is a computer with a CPU (and with MEM etc.). Host computer 200 supports the configuration (as a process) by providing some functionality. As being an FPGA associated computer, it can provide the TEE (cf. FIG. 9).

FPGA 300 also comprises a configuration engine (not illustrated) to receive configuration data 121/122. The configuration engine (or "configuration logic") is usually embedded to the FPGA in a fixed setting. The figure shows FPGA 300 that can receive configuration data 121/122 from configuration computer 100. FPGA 300 could receive configuration data 121/122 from any other computer, such as from support computer 500, or even from equipment 170.

Much simplified, the configuration engine distributes configuration data 121/122 to the elements so that the elements (and electrical connections) are activated or deactivated, according to the array application that the FPGA should perform.

The description uses CONFIG collectively for any carrier that transports configuration data 121/122 to FPGA 300.

FPGA 300 can receive configuration data 121/122 in a way that is well-known in the art, such as by receiving signal sequences known as "bitstream", "configuration bitstream", or occasionally "bitstring". In alternative implementations, FPGA 300 can receive program object files (POF), netlists or the like.

Some FPGAs can store configuration data 121/122 even under power-off conditions, and can re-configure the elements when power is available to the FPGA again. The configuration engine activates or de-activates elements (and electrical connections) according to configuration data 121/122. Once configured, the FPGA can perform particular algorithms (i.e., the array application). The FPGA can remain configured, even if CONFIG (with configuration data 121/122) is removed or deleted.

In other words, configuration data 121/122 may be present in different modalities
CONFIG during transit (such as bitstreams),
CONFIG stored in memory (i.e., in memory of FPGA elements), and
CONFIG present in the activation/deactivation of the elements and connections.

As it will be explained below, it can belong to the risk mitigation approach to have (at least) two array applications, the so-called target array application 322 (explained above for FIG. 1), and the so-called auxiliary array application 321, both being configured by their own configuration data 121/122.

Target array application 322 will be part of the processing application (e.g., image classification).

As it will be explained below, auxiliary array application 321 can provide functionality (so-called "trusted shell approach") to configure target array application 322. Therefore, the auxiliary array application is configured first and the target array application is configured second. Occasionally, there can be further array applications following the same configuration process.

To simplify the notation, a phrase such as "configuration data configures an array application" summarizes the activities of the configuration engine, from receiving configuration data 121/122 to activating/deactivating the elements in an application area.

Network and Support Computer

Support computer 500 is a computer that communicates with host computer 200. Support computer 500 is not necessarily equipped with an FPGA. Nevertheless, support computer 500 can participate in the overall process (such as by optionally running execution engines, in activity 2, explained below).

Network 150 is communicatively coupled to host computer 200 to allow data communication between user 190 and FPGA 300 via host computer 200. In that sense, FPGA 300 is a network-attached FPGA.

Network 150 is—optionally—communicatively coupled to support computer 500, to allow data communication between user 190 and support computer 500, as well as to allow inter-computer data communication. Support computer 500 does not necessarily host an FPGA, but for the purpose of this description it is an FPGA associated computer.

The skilled person would implement the network with secure communication links (by way of example, HTTPS being one protocol, among others).

Computers 200 and 500 represent a plurality of computers on a server farm or the like (occasionally called "cloud"). Computers 200 and 500 can be provided by the service provider (cf. FIG. 1, or "cloud service provider"). Computers 200 and 500 are both located remotely from computer 100.

As in the following, a phrase such as "the user/computer writes data to the FPGA" is a short description of a process in that user computer 100 (in the function of the configuration computer) sends data (such as configuration data 121/122) via network 150 and host computer 200 to FPGA 300. Likewise, "the user/computer reads data from the FPGA" describes host computer 200 and network forwarding data from FPGA 300 to user computer 100. Support computer 500 can participate in that processes.

In view of the communication via network 150, the computers can also be differentiated into "client computer" (here: user computer 100) and "server computer" (here: computers 200, 500).

The term "computer" is a functional term. The skilled person can implement each of computers 100, 200 and 500 by different physical computers. This assumption is however not applicable to FPGA 300 that can not be separated. In other words, there is at least one physical instance of the FPGA hosted by one physical host computer. The computer is a system with a plurality of function modules which, when executed (by the computer system) perform the steps of the computer-implemented method.

The person of skill in the art can link computer 200 to further FPGAs.

As it will be explained, user 190 can have different roles at different phases. In a risk discussion that follows, user 190 can interact with computer 200 (or computer 500) on purpose, for example, to let the computers perform the processing application. But user 190 can also be an attacker user that interacts with the computers to disturb data processing.

Having explained some aspects for the computers, the description now turns the focus to the users (cf. FIG. 1 the center part).

Overview to Phases and Roles

FIGS. 3-6 illustrate simplified time-diagrams to operate FPGA 300 for different phases of user involvement and with users in different roles. While FIGS. 3 and 4 focus on security risks and other risks, FIGS. 5 and 6 focus on measures to mitigate the risks. In the figures, the time processes from left to right.

For simplicity, the figures omit host computer 200 and user computer 100 (cf. FIG. 2).

It is convenient to review the above-mentioned risks in implementing processing applications at least partially by FPGA 300 from the perspective of computer users that act in typical roles in consecutive phases: designer user 191 in design phase **\*\*1, configuration user 192 in configuration phase \*\*2, and operation user 193 in operation phase \*\*3**.

During design phase **\*\*1, FPGA 300 is not necessarily available. FPGA 300/600 may not even be manufactured (cf. FIG. 1). During phase \*\*2, FPGA 300 operates in configuration mode, and during phase \*\*3, FPGA 300** operates in operation mode.

Figure 3:
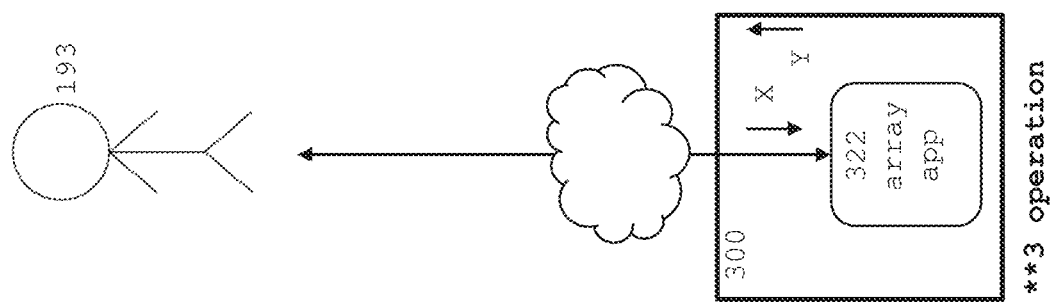
FIG. 3 illustrates a simplified time-diagram introducing the target array application in the context of different phases.
Figure 3:
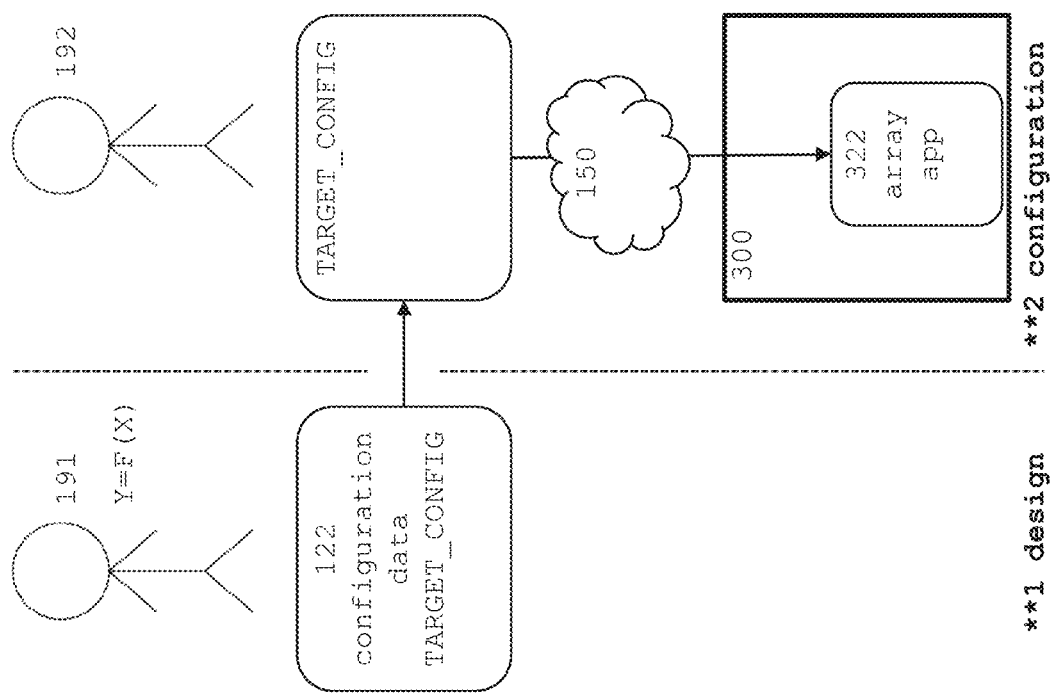

Designer user 191 designs the processing application (with one or more algorithms). Designing is used here as a synonym to developing. In the following, the FPGA application (of that processing application) will be taken as target array application 322 (cf. FIG. 1). FPGA 300 will execute target array application 322 in operation phase**\*\*3. FIG. 3 introduces target array application 322, FIG. 4 introduces target array applications 322A and 322B (to explain risks), FIG. 5 introduces array applications 321 and 322 (with auxiliary and target application, to explain risk mitigation in the first alternative), FIG. 6** introduces a scanner module running on the FPGA to mitigate risks as well, according to the second alternative.

In simplified use-cases for data processing, FPGA 300 should process input data X according to a predefined sequence of steps (i.e., the algorithm F) and should provide output data Y. In simple notation, the algorithm would be Y=F (X). In an example, input X could be an image, function F could be the definition for a (trained) neural network to perform image-classification (with the FPGA elements acting as neurons), and output Y could be a classification value according to a pre-defined set of categories. In such use-cases, the FPGA would function as accelerator: the processing application would be performed faster than in "CPU only" computers.

Designer user 191 can take advantage of computer-aided design (CAD) techniques. For example, designer user 191 can describe the array application in a hardware description language such as VHDL ("Very High Speed Integrated Circuit Hardware Description Language"), and let design software translate from the description language into functionally-equivalent gate-level representation (to activate/deactivate elements). The design software can usually by obtained by the manufacturers of the FPGA.

Design

Design phase **\*\*1 results in configuration data 122. Designer user 191 could hand over configuration data 122 to configuration user 192**. This can be practical when both roles are performed by the same person.

Configuration

In configuration phase **\*\*2, configuration user 192 writes configuration data 122 (for example, the "TARGET_CONFIG") to FPGA 300, via network 150. The description conveniently refers to user 192** as a human user, but the skilled person could introduce automation.

Configuration user 192 could perform the "config write" at the end of the manufacturing line, or in a laboratory setting outside the manufacturing line (equipment with a function similar to that of equipment 170, cf. FIG. 1). In such situations, the FPGA would not yet be inserted as FPGA 300 into host computer 200 (cf. FIG. 2).

However, such approaches are not practical, because they lack flexibility. The FPGA would need to be physically present to configuration user 192. The roles (of designer user 191 and configuration user 192) would be performed by different persons.

The figures therefore illustrate a more realistic scenario with the computers (the configuration computer of configuration user 192 with the host computer) communicate via network 150 (as introduced in FIG. 2).

However, this approach changes the interaction pattern with configuration user 192 (and the configuration computer) dramatically. Configuration user 192 is no longer able to configure the FPGA directly, because the FPGA would physically be attached to the (host) computer. The host computer would just be one computer among many others (cf. FIGS. 2, 200 and 500).

Operation

In operation phase **\*\*3 (at run-time), host computer 200 would perform the processing application. More in detail, host computer 200 would support the interaction with operation user 193 by forwarding input data X from operation user 193 to FPGA 300, and by returning output data Y from the FPGA to operation user 193**. This summary is simplified. Details are well known in the art.

From the view point of an operation user, operation user 193 interacts with his/her computer (cf. user computer 100 in FIG. 2) to upload, for example, an image X to a server computer that is located remotely (such as host computer 200, optionally in cooperation with computer 500). The host computer executes a neural network on its FPGA to classify the image and to return a classification Y result to operation user 193. Very likely, operation user 193 is not aware of the FPGA. The host computer does not have to provide insight.

Separate User Roles

Figure 4:
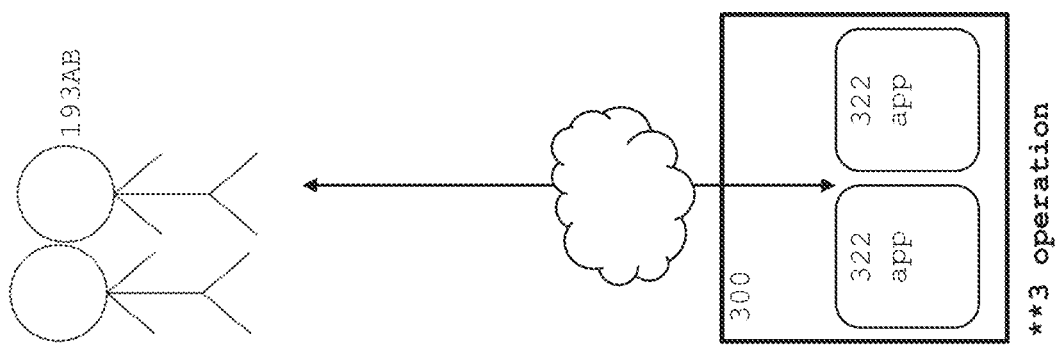
FIG. 4 repeats the time-diagram introducing two target array applications to explain risks.
Figure 4:
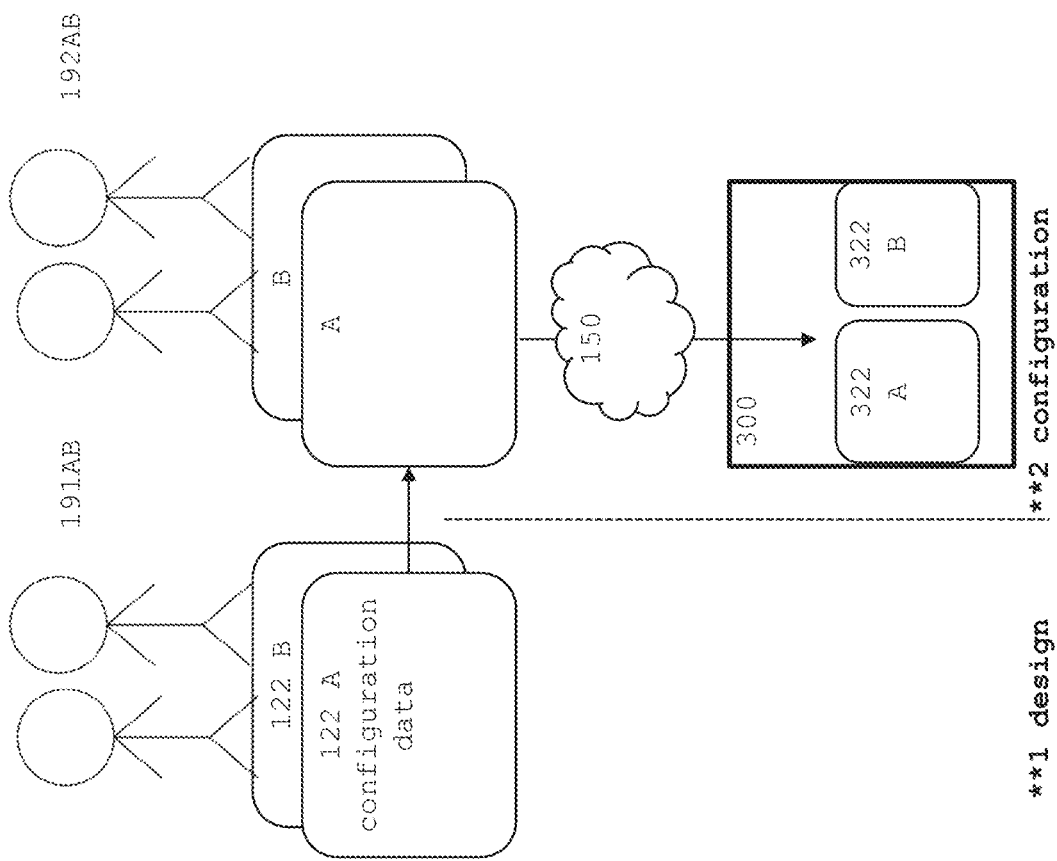

FIG. 4 introduces further users for the phase-differentiated roles. The roles are duplicated but separated.

The description explains how users in different roles interact with the computers separately (A and B). A-from-B-separation is intended, but the description will also explain how an attacker (here B) can break the separation to harm A.

There could be first designer user 191A and second designer user 191B that design first and second target array applications 322A and 322B, respectively. Both users 191A and 191B would normally be unrelated, and the target array applications would normally be unrelated as well.

First configuration user 192A and second configuration user 192B would configure FPGA 300 accordingly.

In a first scenario—time sharing—first configuration user 191A lets host computer 200 load a first configuration (CONFIG_A) into FPGA 300. In operation phase **\*\*3, FPGA 300 would perform target array application 322A for some time (for example to user 193A). Host computer 200** would then remove the configuration CONFIG_A.

Second configuration user 192B would let host computer 200 load a second configuration CONFIG_B into FPGA 300 (physically the same one) to process data according to target array application 322B (for user 193B). There is a requirement to prevent the configuration users cross-accessing the configurations, during the configuration phase (configuration data 122A, 122B) and during the operation phase (array applications 322A and 322B).

In a second scenario—spatial sharing—both configuration users 192A and 192B configure the FPGA with first and second configurations at physically different areas of the FPGA.

Modifications are applicable as well. For example, a single configuration user may apply a single configuration, but lets different operation users 193A and 193B to input X and to receive Y.

Potential Attack Scenarios and Corresponding Security Goals by Example

As already mentioned in connection with FIG. 2, some users may perform roles differently, with malicious (or "rogue") intent. The following attack scenarios give an overview to potential risks.

Attacks can be related to attacking computer users (the attackers), such as host administrator users (not illustrated). For the following it can be further assumed that users 191A, 192A or 193A act properly and that users 191B, 192B or 193B act with malicious intent.

Data protection measures are well-known in the art, and the skilled person would introduce measures such as protecting the computers 100, 200 and 500 by firewalls or the like, by protecting network 150 (encryption or scrambling, cf. the mentioned secure communication link) and so on.

According to a well-known convention, terms in brackets [ ] indicate that content has been encrypted, such as [CONFIG] stands for configuration data in encrypted form and so on. The description assumes that such measures may fail but concentrates on risk that are typical for FPGA implementations.

First Attack Scenario

In a first attack scenario, the attacker is the administrator of computer 200 (not illustrated). The attacker may be interested in knowing configuration data 122 (or 122A in FIG. 4). Acting as so-called "bitstream pirate", the attacker may intercept the configuration data from network 150 on its way to host computer 200 (cf. FIG. 2) or inside host computer 200 on its way to FPGA 300. Potentially, the attacker may use computer 500 for that purpose as well. The first attack scenario comprises situations with an encrypted configuration data, so that the attacker also intercepts the decryption key in some way (cf. the above discussion of manufacturer-added keys).

Mitigation approaches comprise to provide confidentiality measures to keep the configuration data secret (in transit and in rest), to delay decryption of configuration data to a point in time shortly before configuration (in phase **2), to remove secret keys or key-related values after usage (to minimize the physical attack window), and other measures.

The description will describe further details for encryption/decryption below.

Second Attack Scenario

In a second attack scenario, the attacker might be interested in retrieving configuration data (of array application 322A). The attacker may let FPGA 300 perform a sniffing application (time sharing, or spatial sharing being assumed) to obtain configuration data, to obtain encryption keys etc. The attacker could, for example, take the role of configuration user 192B (cf. FIG. 2B) and—at operation phase **3—array application 322B would investigate its co-shared array application 322A.

The skilled person is familiar with the problem of so-called side-channel-attacks or covered-channel attacks (based on effects such as power leakage, or cross-talk). There is a requirement to protect the configuration (and keys of they are available) while at rest in FPGA 300.

Mitigation approaches also comprise to delay decryption of configuration data to a point in time shortly before configuration (in phase **2). Further, and the description will refer to that in great details, the scan for malicious code is performed.

The scenario is related to the following scenarios, so that the mitigation approach for the second scenario can (re)used as well.

Third Attack Scenario

As mentioned, communication between different computers and communication over networks would use secure communication links to mitigate network adversary, but nevertheless such security measures might fail.

In a third attack scenario, the attacker may change configuration data 122 while in transit (for example in form of the bitstream, via the network to the server). In a variation, the attacker may hide as configuration user 192B and try to change the configuration (after target application 322A has been configured).

Mitigation approaches comprise to detect such changes by checking the integrity of the bitstreams, and authorizing configuration user 192A to configure FPGA 300 only.

Forth Attack Scenario

In a fourth attack scenario, an attacking configuration user 192B may trigger a denial of service (DoS) attack by configuring FPGA 300 to create an oscillation, a short-circuit or the like. There is even no need to receive data X or to provide Y. As a result of the attack, FPGA 300 may physically fail during the operation phase 3. (The time between 2 and **3 could be in the order of milliseconds).

The mitigation approach comprises to scan the configuration data for malicious code ("virus" or the like) and authorizing the configuration users.

Two Alternatives

The above-mentioned scanner module can be implemented in two alternatives. FIG. 5 illustrates some steps of the first alternative (with the TEE), and FIG. 4 illustrates some steps for the second alternative (with the on-array-processor).

Configuring in Two Sub-Phases

Figure 5:
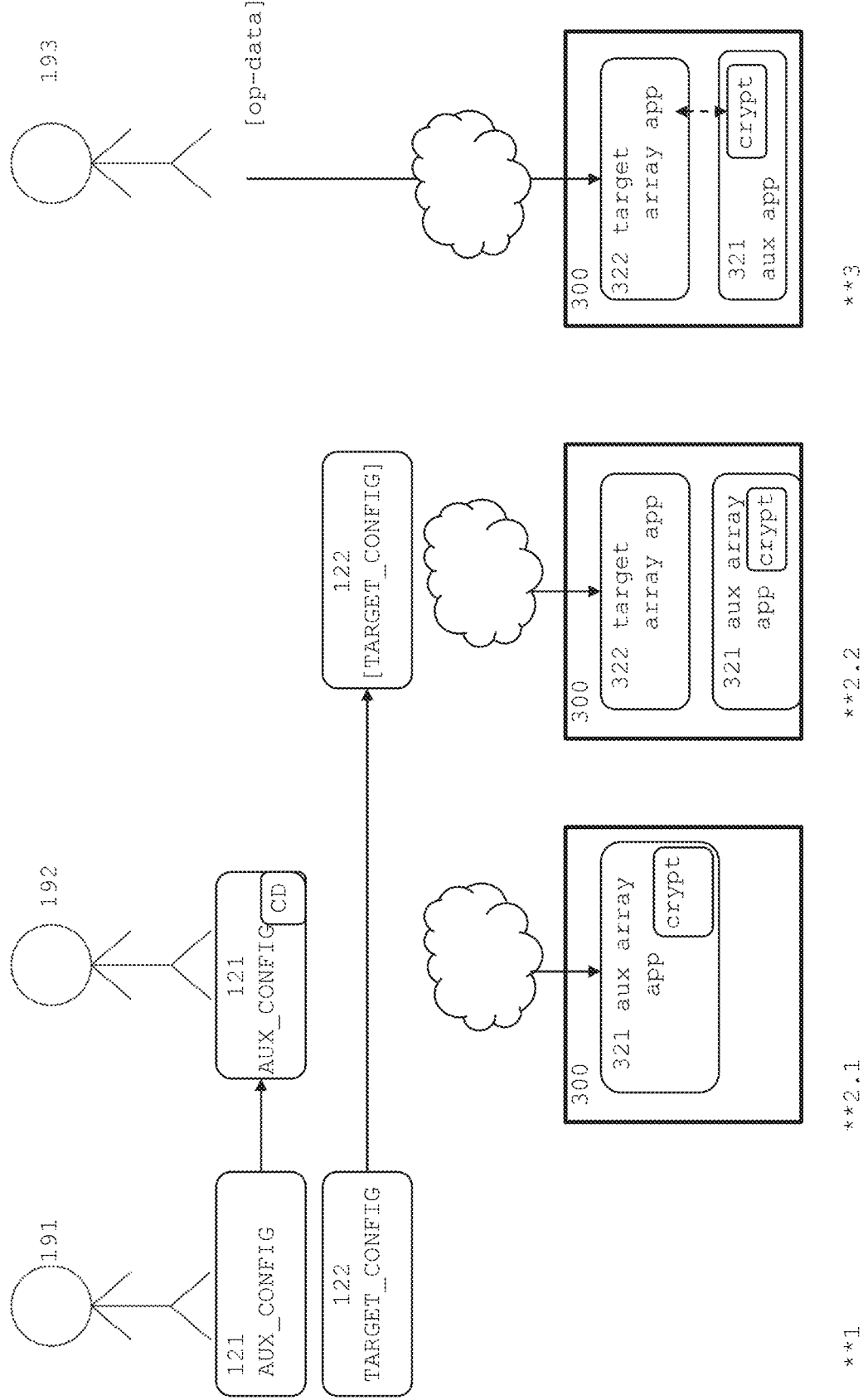
FIG. 5 repeats the time-diagram introducing auxiliary and target array applications, to explain risk mitigation in a first alternative.

FIG. 5 repeats the illustration of the simplified time-diagram for the operation of FPGA 300 (for different phases of user involvement and with users in different roles) by dividing configuration phase **2 into two sub-phases.

The two-sub-phase approach can be applied to implementations with any number of users.

First Sub-Phase **2.1

Configuration user 192 writes configuration data 121 to enable FPGA 300 to execute auxiliary array application 321. The auxiliary array application 321 comprises at least a decryption function ("crypt", cf. FIG. 7). Configuration data is auxiliary configuration data 121.

The configuration engines of FPGA 300 operates; and at the end of the first sub-phase, FPGA 300 has been configured to execute auxiliary array application 321.

Second Sub-Phase **2.2

Configuration user 192 writes TARGET_CONFIG 122 for target array application 322, in encrypted form [TARGET_CONFIG].

[TARGET_CONFIG] reaches auxiliary array application 321. The auxiliary array application decrypts [TARGET_CONFIG] with the decryption function back (crypt) to TARGET_CONFIG. Then, auxiliary array application 321 configures the FPGA 300 with TARGET_CONFIG and thereby enables it to execute target array application 322.

Interrelation

Both sub-phases are interrelated and risks that may occur in running the auxiliary array application are mitigated by bi-directional authentication activities, by integrity checks, by scans for malicious code and others.

From Overview to Details

As auxiliary array application 321 plays a particular role, the description introduces some functions. One linking element between FIG. 5 and some of the following figures is noted: The acronym "CD" stands for code in configuration data 121 that configures standard functionality (for example a function that supports challenge and response) to be available in auxiliar array application 321. For simplicity, it can be assumed that CD corresponds to configuration data 121, or corresponds to a subset of configuration data 121.

CD will be used as input to a hash function that is part of an integrity verification (e.g., HMAC). In some implementations, CD is that part of configuration data 121 for that integrity is required (corrupted configuration could cause mis-functionality, to be prevented).

Figure 6:
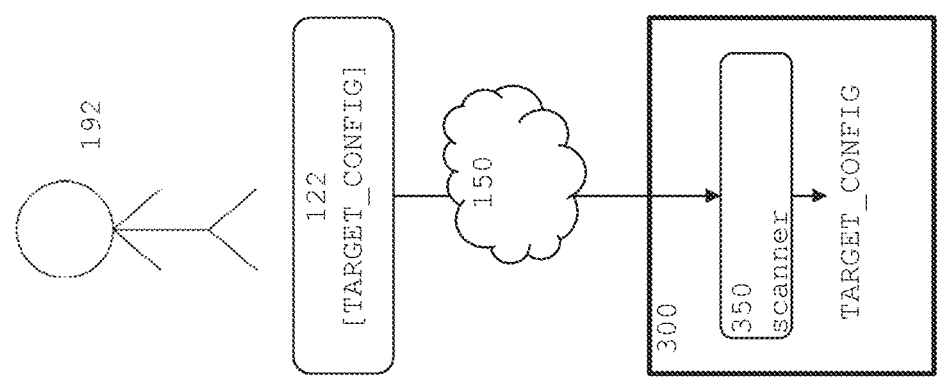
FIG. 6 repeats the time-diagram partially introducing a scanner module running on the FPGA to mitigate risks in a second alternative.

FIG. 6 illustrates scanner module 350 implemented as an on-array-processor. [TARGET_CONFIG] arrives via network. The host computer forwards [TARGET_CONFIG] to FPGA 300, where module 350 checks the configuration data for malicious code and forwards it (already decrypted) to the configuration engine that subsequently configures the target array application to the fabric of the FPGA (i.e., to an area that is not occupied by the on-array-processor).

Scanner module 350 is used for implementing the second alternative.

Functions Available During Execution of the Auxiliary Array Application

Figure 7:
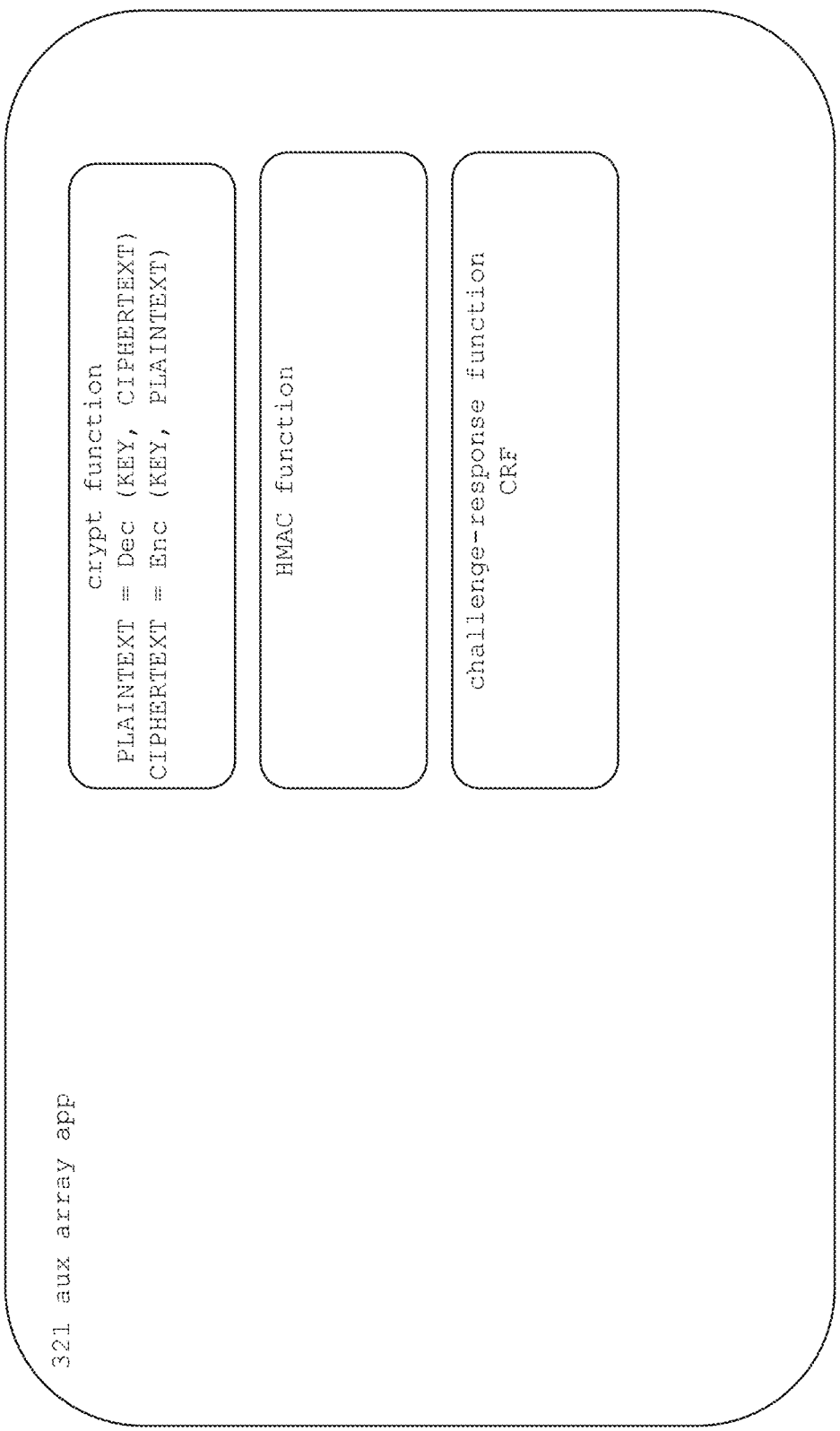
FIG. 7 illustrates the auxiliary array application with functions that are available during execution on the FPGA.

FIG. 7 illustrates auxiliary array application 321 with functions that are available to auxiliary array application 321, when application 321 is being executed by FPGA 300-2.

There is no need to implement all these functions by auxiliary array application 321 itself. Some of the functions can be implemented otherwise as the functions can be called from auxiliary array application 321.

Crypt

Function CRYPT is used to decrypt data, such as to decrypt [PLAINTEXT] to PLAINTEXT, also noted as PLAINTEXT=Dec (KEY, CIPHERTEXT). Optionally, function CRYPT can be used to encrypt data, usually noted as CIPHERTEXT=Enc (KEY, PLAINTEXT). The KEY is the encryption/decryption key. PLAINTEXT and [PLAINTEXT] (or CIPHERTEXT) are just placeholders.

Some implementations can use so-called authenticated encryption with associated data, well known in the art, noted also as AuthEnc (KEY,PLAINTEXT).

By way of example, the function can be called as follows:

TARGET_CONFIG=DEC($R\_i+1$,[TARGET_CONFIG]), with the CRF response $R\_i+1$ acting as KEY, with the target configuration data in encrypted form as input, and with the output being the target configuration data in decrypted form.

The skilled person can take a standardized function from a library, and the above-mentioned advanced encryption standard (AES-128 or AES-256) is just one example.

Challenge Response Function

The challenge response function CRF receives the challenge C, interacts with the FPGA, and provides the response R. This is an example for a function that can be implemented by the manufacturer as well (cf. FIG. 1). The challenge response pairs are collected in advance (at the end of the manufacturing line) and the function can remain (within the FPGA) to the executed again (i.e., during run-time of the auxiliary array function).

Random Function

The random function provides a numerical value (such as a bit sequence) at random (or arbitrarily). In some implementations, the function can be implemented as a true random number generator (TRNG): that is a function that interacts with the FPGA hardware to obtain a random number from a physical process.

By way of example, the function can be called to obtain a once-use value, or nonce.

Hash Function

Function HMAC is used to authenticate messages involving a cryptographic hash function and secret cryptographic key, such as in VALUE=HMAC (KEY_1, KEY_2 MESSAGE). The symbol stands for concatenating.

By way of example, the function can be called as follows:

PROOF_OF_INTEGRITY_TA=HMAC($R\_i$, $N\_i$||CD).

This notation implies that—in the example—the CRF provides a response $R\_i$, the TRNG obtains the nonce $N\_i$, and that CD is available as well.

Use of the CRP to Retrieve a Key

The authentication of a particular FPGA instance can be performed by any user who has access to the collection of CRPs. Since a particular challenge C leads to a particular response R, the particular C can be used to derive the key (taking R as the key for decrypting the configuration data, cf. "crypt" in auxiliary array application 321, FIG. 5). Intercepting C (on transit) is still possible, but the use of a particular C can be limited. The key (i.e., a particular response R) is related to a particular FPGA.

Availability of the Functions

Functions that are explained here with FIG. 7 can also be implemented outside the FPGA. For example, the CRF is performed after manufacturing (cf. the explanation in FIG. 1, equipment 170), HMAC is also performed by the configuration computer, and so on.

Figure 8:
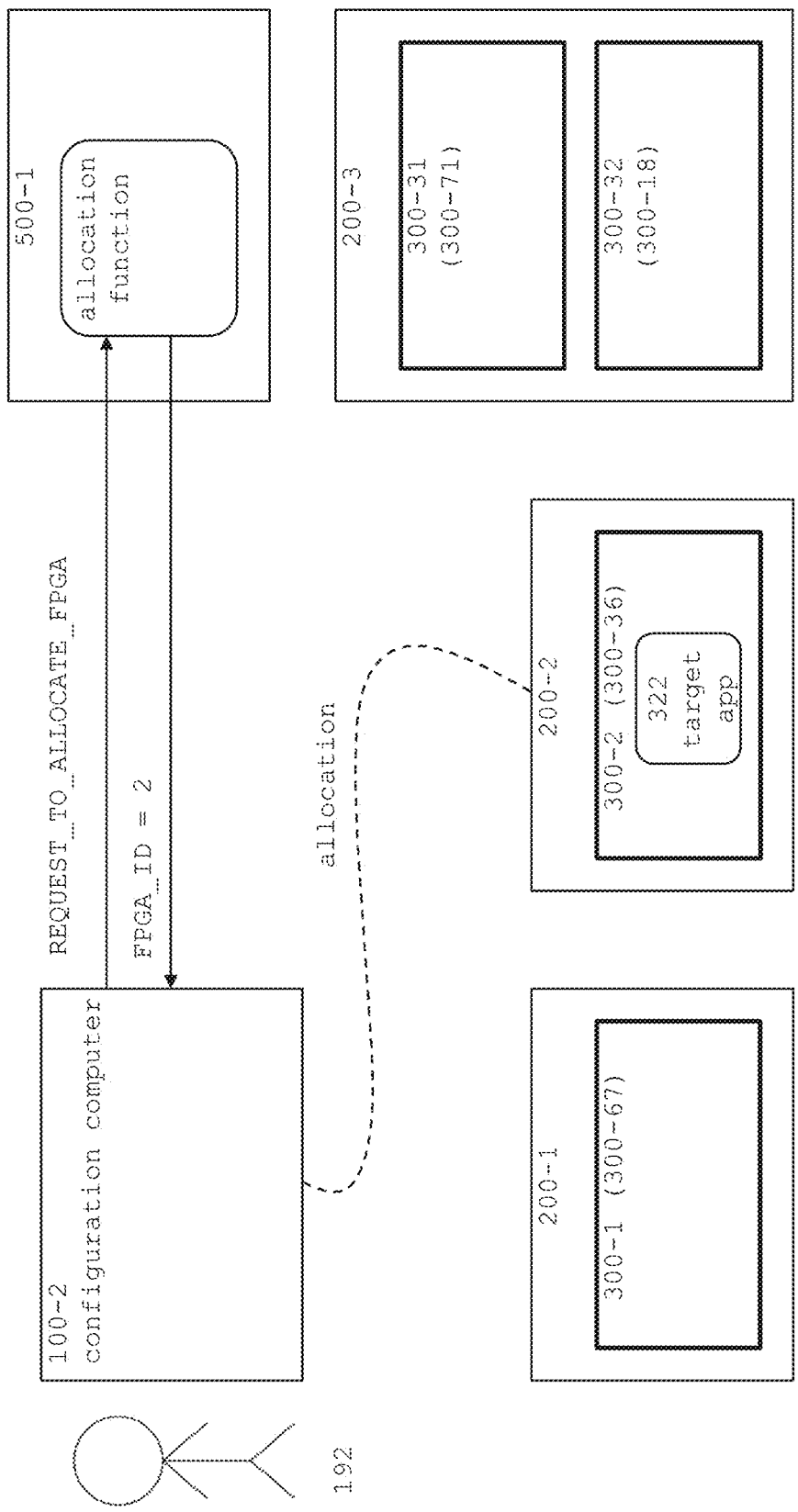
FIG. 8 illustrates a computer system with multiple computers, such as computer instances.

FIG. 8 illustrates the computer system with multiple computers, such as computer instances 200-1, 200-2, 200-3 of host computer 200 (cf. FIG. 2) and instance 500-1 of support computer 500 (cf. FIG. 2).

There are multiple FPGAs 300 in instances 300-1, 300-2, 300-31, 300-32 (i.e., a pool of available FPGAs). Computer 200-3 has even two FPGAs.

Allocating a Particular FPGA Instance

In settings such as in FIG. 2, computers 200 and 500 provide services in a variety of schemes, such as Infrastructure as a Service (IaaS), Platform as a Service (PaaS), Software as a Service (SaaS), Function as a Service (FaaS) or the like.

Services that involve FPGA can be Acceleration-as-a-Service (AaaS), or FPGA-as-a-Service (FaaS). To stay with the above-mentioned image processing example, the FPGA would act as accelerator.

For such FPGA involved services, the provider identifies a particular FPGA to use. In some cases, it might be relevant to perform the service on a particular FPGA, for example, if access to the same physical FPGA is to be restricted according to policies.

The skilled person can implement the FPGA identification otherwise, so that the configuration computer "knows" what FPGA to configure.

In the example of FIG. 2, the FPGA instances 600-1 to 600-N are identifiable by manufacturer numbers in form of serial numbers n={67, 36, 71, 18}.

Risks in relation to users accessing the FPGAs should be mitigated. For example, two configuration users 192A and 192B (cf. FIG. 4) should only be allowed to access a particular instance if these users comply with pre-defined definitions (e.g., belong to the same company).

Hence there is a need to identify a particular FPGA, at least in the configuration phase **2 and to allocate the particular FPGA to a particular configuration computer 200-2 (with configuration user 192).

For convenience, it can be assumed that computer 500-1 (cf. FIG. 8) performs an FPGA allocation service.

Configuration computer 100-2 has sent a service request ("REQUEST_TO_ALLOCATE_FPGA") to support computer 500-1. Taking pre-defined allocation and scheduling policies into account, computer 500-1 has allocated instance 300-2 (or 36, on host computer 200-2) to configuration computer 100-2 accordingly.

Computer 500-1 keeps a table of the instances {67, 36, 71, 18} in manufacturing numbers, in combination with allocation information.

However, such a straightforward approach may not be preferred. For example, the service provider revealing the manufacturer-added number according to the manufacturer ID scheme {1 . . . N} might reveal data that the service provider or the manufacturer does not want to disclose.

Revealing serial or manufacturing numbers may also create a security risk (attackers may focus the attacks on particular FPGA).

Instead of n, the service provider can communicate with token-numbers (or pseudo-numbers), here in the example, token-number ID_1 instead of manufacturer-number 76, token-number ID_2 instead of manufacturer-number 36, ID_31 instead of 71, or ID_32 instead of 18. The example shows an allocation of instance 300-2 so that configuration computer 100-2 would receive identification=ID_2 (the token-number of the particular FPGA) instead of 36 (the manufacturer number).

The description uses "ID" in formulas or the like, but the manufacturer numbers could also be applied (although at a different risk level).

The skilled person can apply further measures, such as communicating IDs in encrypted form, to use only-once token, or other measures.

Restricted Allocating

The allocation function of FIG. 8 in computer 500-1 could respond to requests from other configuration computers. It is possible to restrict the allocation of a particular FPGA instance to a particular configuration computer, or even to a particular configuration user.

Configuring an FPGA in a Multi-Computer Environment

While FIG. 2 illustrate a single user computer 100 communicating with a single FPGA host computer 200, without differentiating instances or the like, such a single-to-single setting would not reflect reality. FIG. 4 remains simplified as well. In some implementations, there are systems with multiple computers:

There are potentially hundreds or thousands of computers (host computer, support computers) that are physically located in server farms. Usually, such computer systems are operated by the service providers.

There are potentially even more user computers (cf. FIG. 4 showing multiple user computers) being served by the service providers.

The description now takes multiple instances into account and summarizes an approach to establish the configuration of target array application 322 on a particular instance (here: FPGA 300-2) from a particular user computer (here configuration computer 100-2 with configuration user 192, cf. FIG. 5).

For convenience, the description explains the approach by a consecutive sequence of activities with introducing the activities in view the risks that they mitigate.

Figure 9:
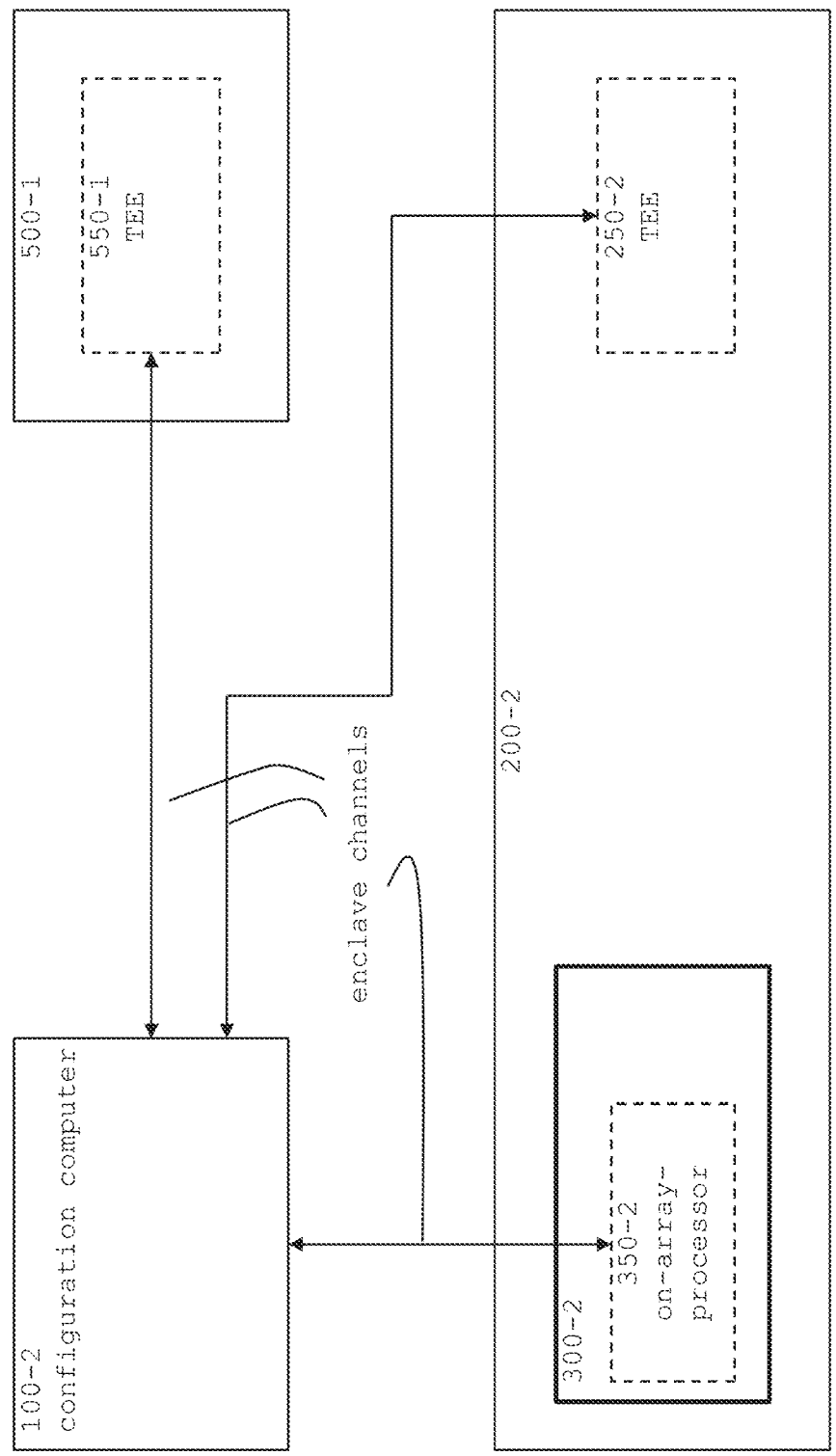
FIG. 9 illustrates a computer system with host and support computers.

FIG. 9 illustrates a computer system with host computer 200-2 and support computer 500-1. The figure also illustrates scanner modules 250-2, 350-2 and 550-1 (in instances). The modules are associated with host computer 200. The modules communicate with configuration computer 100-2, and the modules have (at least) the functions to decrypt target configuration data [TARGET_CONFIG] to TARGET_CONFIG, and to scan the target configuration data TARGET_CONFIG for malicious code.

Depending on the physical location of the module (outside the FPGA or inside the FPGA), the scanner modules can be implemented in the above-mentioned two alternatives:

In the first alternative, scanner module 250-2 is associated with host computer 200-2 by being implemented as a trusted execution environment (TEE) of host computer 200-2. The first alternative can be varied: the scanner module can be associated with host computer 200-2 by being implemented as TEE as well (550-2 in the figures) in support computer 500-1, not in host computer 200-2. When the CPU of host computer 200-2 or of support computer 500-1 is a CPU commercially available from INTEL, the Software Guard Extensions (SGX) are convenient to use.

TEEs are commercially available, for computers with instruction set architectures (ISA), for example, from Intel Corporation, Santa Clara CA, US (SGX, as mentioned already), Advanced Micro Devices, Inc., Santa Clara CA, US (Secure Encrypted Virtualization SEV, or Platform Security Processor PSP), ARM Limited, Cherry Hinton, UK (TrustZone), and others. The skilled person may also set up a TEE based on a RISC-V architecture In the second alternative, scanner module 350-2 is associated with host computer 200-2 by being implemented as on-array-processor (that is an element of the fabric area within FPGA 300-2 as explained above). The on-array-processor can be implemented by at least one on-array-processor in hardware or software (two options, mentioned above as well).

The figure shows implementations of scanner modules 250-2, 550-1 and 350-2, but only one module has to be implemented. The selection of the alternatives depends on the availability of computer components. The use of a TEE is convenient for a FPGA without processor cores in their fabric. The use of the on-array-processor is convenient in case the host computers that can't support a TEE.

In both alternatives, the scanner modules 250-2, 550-1 and 350-1 can be regarded as enclaves that communicate with communication computer 100-2 via enclave channels. The skilled person can implement measures to keep these channels free of interference from host computer 200-2, from support computer 500-1 and from FPGA 300-2.

FIG. 9 is suitable to illustrate an aspect that is related to the target configuration data. TARGET_CONFIG should not leave the TEE because attackers would be able to intercept TARGET_CONFIG (not encrypted), from module 550-1 to FPGA 300-2 via the connection between support computer 500-1 and host computer 200-2. TARGET_CONFIG can leave scanner module 350-2 because TARGET_CONFIG belongs to FPGA 300-2 already.

Figure 10:
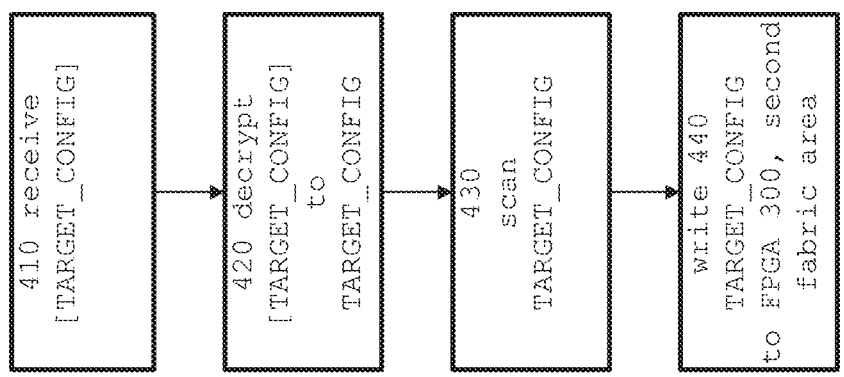
FIG. 10 illustrates a flowchart of computer-implemented method for operating a host computer that is communicatively coupled to a configuration computer via communication network.

FIG. 10 illustrates a flowchart of computer-implemented method 400 for operating a host computer that is communicatively coupled to a configuration computer via communication network, and that is associated with a FPGA having a fabric area.

Method 400 is a method to configure the FPGA to execute a target array application (cf. 322 in FIG. 1).

The host computer (step 410) receives target configuration data (122, [TARGET_CONFIG]) from the configuration computer, in encrypted form.

A scanner module (cf. 350-2, 250-2, 550-1 of FIG. 9) that is associated with the host computer, decrypts (step 420) the target configuration data and scans (step 430) the target configuration data for malicious code.

Provided that malicious code is absent, the host computer writes (step 440) the target configuration data to the fabric area of the FPGA, and thereby configures the FPGA accordingly, to enable execution of the target array application.

Activities (First Alternative, with TEE)

The description now explains the configuration of FPGA 300-2 with target array application 322 with more detail. It will start by explaining details for the first alternative (of the scanner module). As this first alternative involves the TEE (cf. FIG. 9, 550-1 or 250-2), there will be synergistic use of some data (such as challenge response $C\_i+1$ and $R\_i+1$) in relation to the TEE ($R\_i+1$ is a variable) and to the auxiliary array application 321.

Activity 0 (Enrolling the Challenge Response Function CRF)

In activity "zero", the trusted entity (e.g., the manufacturer) identifies challenge response pairs CRP to enable authentication of particular FPGA instances. This process has been described above in connection with FIG. 1. This activity is labelled "zero" because it is not performed by the configuration user (or configuration computer).

Activity 1 (Allocating FPGA Instance to Configuration Computer)

Activity 1 marks the beginning of the configuration phase 2. An allocation-service allocates particular instance 300-2 to be configured (for target application 322). Configuration computer 100-2 receives the identification of the allocated instance 300-2**.

FIG. 8 illustrates the allocation by an allocation service running on support computer 500-1. (REQUEST_TO_ALLOCATE_FPGA from configuration computer 100-2 and response FPGA_ID=2 to configuration computer 100-2.)

Optionally, configuration computer 100-2 can receive FPGA_ID=2 in token-numbering. Alternatively, configuration computer 100-2 can receive the identification in the manufacturer-numbering (e.g., n=36)

Configuration computer 100-2 also receives challenge response related data, based on the CRP-collection (cf. database 180 and assistance 160 in FIG. 1), to be used later in activity 4 (cf. FIG. 11). It can be advantageous when configuration computer 100-2 receives the challenge response data following allocation. But in some implementations, configuration computer 100-2 may receive the challenge response data in advance (for FPGAs for that allocation is possible).

It is convenient when configuration computer 100-2 also receives the following:

PROOF_OF_INTEGRITY_TA=HMAC($R\_i,N\_i$∥CD)

The variable PROOF_OF_INTEGRITY_TA can be calculated by assistance 160 (or other computers).

R_i is a response (previously collected, cf. FIG. 1, with index i identifying a particular challenge, from many challenges I>=2)

N_i is a nonce value (value used only once, for example a 64 bit sequence, from database 180).

CD has been explained above (FIG. 5).

Configuration computer 100-2 can receive the mentioned data via networks (not illustrated, but indicated in FIG. 1 by database channel 182), using standardized communication protocols (with pre-defined message formats and the like). The skilled person will protect the messages, by encryption or the like.

In addition to PROOF_OF_INTEGRITY_TA, configuration computer 100-2 also receives a CRP with challenge C_i+1 and response R_i+1. With that data, configuration computer 100-2 can authenticate the particular FPGA 300-2.

It does not matter whether computer 100-2 receives the allocation first and the proof second, or vice versa.

Figure 11:
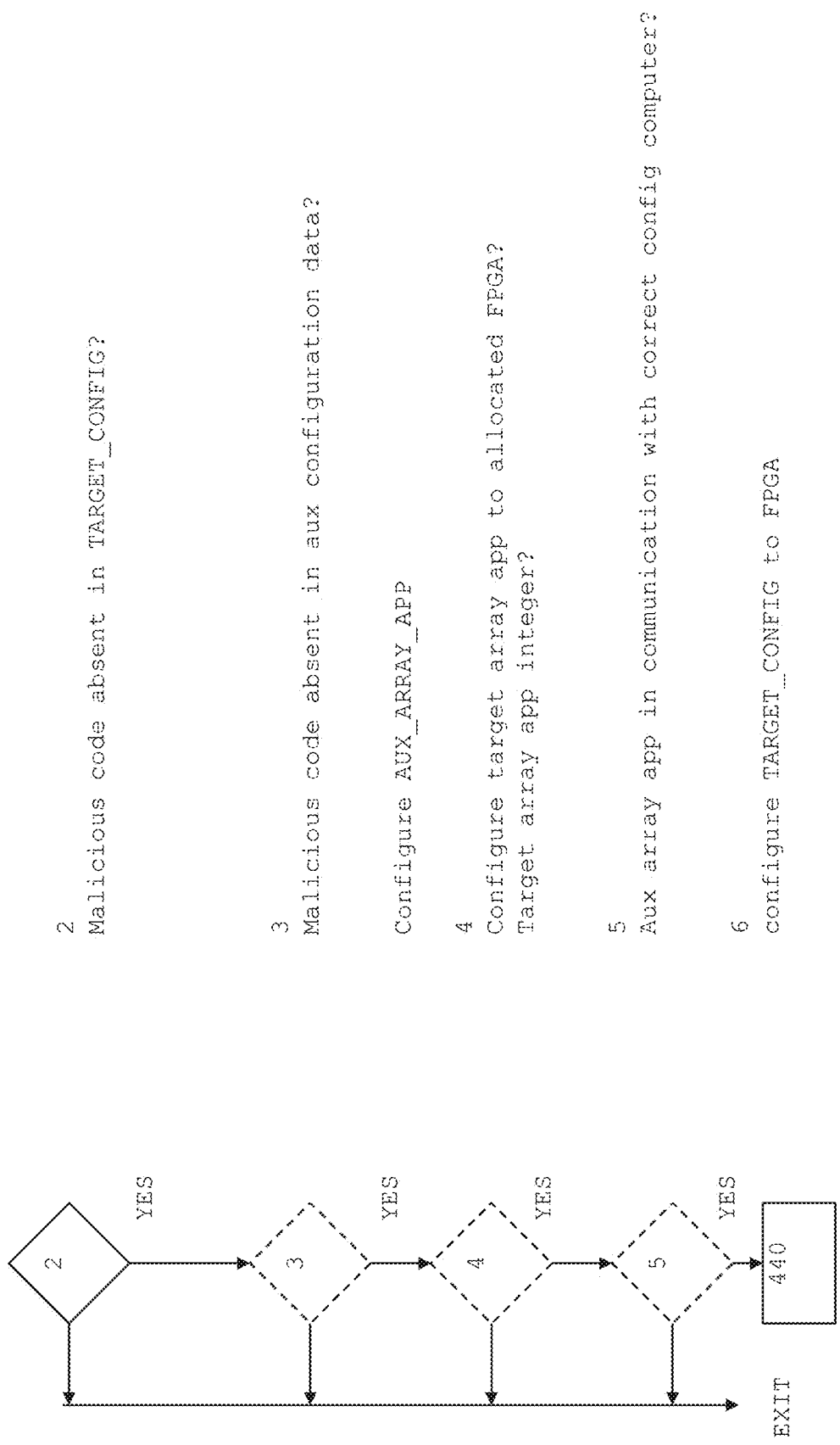
FIG. 11 illustrates a flow chart for activities that are performed—optionally—together with the method.

FIG. 11 illustrates a flow chart for activities that may be performed—optionally—together with method 400 (of FIG. 10). The last activity corresponds to step 440 (of FIG. 10).

The figure illustrates activities 2, 3, 4 and 5 as check steps, with an exit line to the left, and a continues (YES) line leading to step 440 (configure TARGET_CONFIG to FPGA). Activities leading to the exit line would trigger the computers to perform predefined functions, such as removing configuration data from the FPGA, informing the configuration user, or other measures.

In principle, the activity flow is applicable for both alternatives (TEE and on-array-processor), but activities 3, 4 and 5 are optionally performed for the first alternative (TEE) and not required for the second alternative (on-array-processor).

Activity 2 to Activity 6 (First Alternative TEE)

Activities 2 to 6 can be regarded as a method for configuring FPGA 300 with target array application 322. The activities are adapted to scanner module 250-2 and 550-1 (first alternative with the TEE).

Configuration computer 100-2 is operated by configuration user 192 (cf. FIG. 5) and configuration data 122 is available to configuration computer 100-2 (as TARGET_CONFIG, not yet encrypted).

Some of the activities comprise yes/no verifications, and method execution is aborted when any of the verifications fails (cf. the exit-line in the method chart).

In other words, the participating entities (configuration computer, scan module, host/support computer) will arrange the handover from activity to activity. The skilled person can provide acknowledgements or the like.

The participating entities optionally use secure communication links, and the skilled person can implement them as well. By way of example, establishing a secure link with a session key is explained for activity 2.

An example for the applicability of secure links is the exchange for handover information (cf. the YES in the FIG. 11), because attackers might change a NO to a YES.

Activity 2

Activity 2 is a scan to ensure that the configuration data 122 does not comprise malicious code.

The participants in this activity are configuration computer 100-2 and scanner module 250-1 (or 550-1).

The configuration computer and the scanner module establish a secure communication link. The skilled person can implement such a link by applying well-known approaches, such as using Diffie-Hellman exchange (or the like, optionally with built in elliptic curve cryptography ECC) that allows the configuration computer and the scanner module to calculate a session key SK_client.

SK_client protects the communication of the KEY that is needed to encrypt TARGET_CONFIG.

It is noted that the KEY to encrypt the target configuration data TARGET_CONFIG has been derived from the (particular) FPGA 300-2 as R_i+1. Since the TEE can't challenge the FPGA, the configuration computer sends this KEY=R_i+1 via the secure communication link.

Configuration computer 100-2 encrypts configuration data 122, wherein R_i+1 serves as the target configuration key:

[TARGET_CONFIG]=AuthEnc($R\_i$+1,TARGET_CONFIG)

Configuration computer 100-2 sends [TARGET_CONFIG] to scanner module 250-2 (or to 550-1).

Configuration computer 100-2 encrypts R_i+1:

[$R\_i$+1]=AuthEnc(SK_Client,$R\_i$+1)

and sends [R_i+1] to the scanner module (i.e., to the TEE).

The scanner module decrypts [R_i+1] to R_i+1 and decrypts [TARGET_CONFIG] to TARGET_CONFIG, and performs a check (of TARGET_CONFIG) for the absences of malicious code.

The scanner module communicates with its computers (host computer or support computer) but this communication is limited to a report ("virus-free only", or "free of malicious code" or reports in equivalent content).

Activity 2 (Optional Steps)

There are two further security measures that the skilled person can implement optionally:

To reduce the risk of running a TEE (with malicious code), the configuration computer and the TEE can perform an attestation, with the goal to authenticate the TEE to the configuration computer, and to confirm the integrity of the TEE to the configuration computer.

To reduce the risk that the report is modified (that is handover information, for example by malicious code running on the host or support computers, for example, changing "NO" to "YES, malicious code is absent"), the report can be communicated to the configuration computer in a protected way.

It is further possible to enhance the security measures by combining them with other measures, such as by disabling connections (such as ports) after use.

Activity 3 (Optional Step)

Although TARGET_CONFIG is available within the scanner module (in decrypted form), transferring TARGET_CONFIG to FPGA 300-2 would create the risk of interception (on the way through host computer 200-2 and/or support computer 500-1). The method takes a different path.

Activity 3 marks the configuration of auxiliary array application 321 to the allocated FPGA 300-2. Substantially the same auxiliary array application 321 can be used by different configuration users. It could be available in assistance 160 (cf. FIG. 1).

However, an attacker may change auxiliary configuration data 121 (for that auxiliary array application) while in transit (from computer 100-1 to computer 200-2/500-1 or otherwise). Activity 3 therefore comprises a scan for malicious code (such as for viruses), performed at computer 200-2 (or computer 500-1). The scan can be performed relatively easily because the configuration data arrive in plain, non-encrypted form.

Assuming the absence of malicious code, activity 3 ends by configuring FPGA 300-2 with auxiliary configuration data 121.

The skilled person can enhance activity 3 by an integrity check, with the goal to check if the FPGA has been properly configured with the auxiliary array application.

Activity 4

Auxiliary array application 321 might have been configured at a different FPGA (not FPGA 300-2), with consequences such as eventually leading to the execution of malicious code on that different FPGA etc.

Activity 4 marks the verification that auxiliary array application 321 has been configured correctly (integrity check), in combination with a further verification that auxiliary array application 321 has been configured to the FPGA 300-2 that has been allocated.

In other words, from the view point of configuration computer 100-2 the yes/no questions have to the answered:

Does auxiliary array application 321 has the property to be the application to be configured for the particular FPGA instance 300-2 (that was allocated earlier?). This is a question of authentication.

Does auxiliary array application 321 has the property to be the application provided by the manufacturer (for example, or other trusted party, see FIG. 1)? This is a question of integrity.

The participants in this activity are configuration computer 100-2 and FPGA 300-2 that executes auxiliary array application 321 (cf. the functions implemented as explained with FIG. 7). The skilled person can implement the communication between the participants by secure communication links, without the need of further explanation herein.

The steps are the following:

Configuration computer 100-2 obtains challenge C_i (for example, from database 180, via assistance function 160). It has already obtained the nonce N_i earlier (described in activity 1). The skilled person can deviate from that order slightly (for example, to let computer 100-2 obtain the challenge earlier).

Configuration computer 100-2 sends challenge C_i and nonce N_i to application 321.

Application 321 applies challenge C_i to its challenge response function CRF (cf. FIG. 7) and obtains R_i.

Application 321 operates its HMAC function according to:

PROOF_OF_INTEGRITY_FPGA=HMAC($R\_i$, $N\_i \| CD$).

Application 321 sends PROOF_OF_INTEGRITY_FPGA to the configuration computer.

Configuration computer 100-2 compares PROOF_OF_INTEGRITY_FPGA with PROOF_OF_INTEGRITY_TA. For identity of the PROOF-variables, the above questions are affirmed.

It is noted that R_i is related to the particular FPGA (any other FPGA would return a different response). CD is related to the particular configuration data 121, and any modification would change the PROOF as well.

Regarding the nonce, it is noted that it goes from the manufacturer via the configuration computer to the FPGA (or from any other trusted entity).

Activity 5

Activity 5 marks the authentication of the configuration computer to the auxiliary array application. In other words, from the view point of the auxiliary array application, the following yes/no question has to the answered:

Does the auxiliary array application communicate with the configuration computer to which the FPGA has been allocated previously?

The authentication of the configuration computer to the allocated FPGA makes it more difficult for other computers (such as configuration computers under control of attackers) to install auxiliary array applications that eventually cause the configuration of other array applications.

Activities 4 and 5 could be performed in either order, or performed in parallel.

Both activities are similar by exchanging a nonce value (although in different directions).

The steps for activity 5 are the following:

Auxiliary array application 321 generates a nonce N_i+1 and sends it to configuration computer 100-2.

Similar as in activity 1, configuration computer 100-2 calculates a proof value:

PROOF_OF_AUTHENTICITY_CONFIG_COMPUTER=HMAC($R\_i+1, N\_i+1 \| CD$).

Configuration computer 100-2 challenges FPGA 300-2 (by sending C_i+1, obtained earlier, such as during activity 1).

Configuration computer 100-2 forwards the PROOF-value.

Auxiliary array application 321 obtains response R_i+1. The response R_i+1 alone does not convey any authorization.

Auxiliary array application 321 calculates a further proof value:

PROOF_OF_AUTHENTICITY_FPGA=HMAC($R\_i+1, N\_i+1 \| CD$).

Auxiliary array application 321 compares the PROOF values. For identity, the question is confirmed (YES).

Activity 6

Activity 6 marks the configuration of target array application 322 to instance 300-2.

Host computer 200-2 has received [TARGET_CONFIG] earlier (optionally, it receives it from support computer 500-1]. The skilled person can slightly modify the order by letting the configuration computer re-send [TARGET_CONFIG] to host computer 200-2.

Auxiliary array application 321 applies the CRYPT function (cf. FIG. 7) to decrypt [TARGET_BITSTREAM] to TARGET_BITSTREAM, by a decryption that uses response R_i+1 (as the decryption key).

There is synergy in re-using this response R_i+1 in activity 2 and in activity 5.

Activity 7

In an optionally performed activity, user computer 100 can interact with host computer 200 to confirm the integrity of target array application 322 on FPGA 300. Non-confirmation would lead to the exit line as well, cf. FIG. 11.

There are several ways to performs such a confirmation, for example by the following steps:

Configuration computer 100-2 obtains nonce N_i+2 and communicates it to auxiliary array application 321.

Configuration computer 100-2 calculates a proof value:

PROOF_OF_INTEGRITY_TARGET($R\_i$+1,$N\_i$+2CONFIGURATION)

Auxiliary array application 321 uses the response R_i+1 and the nonce to calculate a proof value as well:

PROOF_OF_INTEGRITY_FPGA=HMAC($R\_i$+1, $N\_i$+2CONFIGURATION).

Auxiliary array application 321 causes the FPGA to transmit the proof value to configuration computer 100-2 (via the host and the network).

Configuration computer 100-2 compares both PROOF values and confirms (or denies) the integrity.

There is synergy in auxiliary array application 321 re-using R_i+1. CONFIGURATION stands here for the target array application after being configured to the FPGA. The configuration computer usually can obtain CONFIGURATION from TARGET_CONFIG, for example by tools provided by the FPGA manufacturer, such as the mentioned CAD-tools.

Activities (Second Alternative, On-Array-Processor)

The explanation of the activities is applicable to the second alternative as well, with scan module 350-2 (being part of FPGA 300-2). There is—however—no need to perform activities 3, 4 and 5 because an auxiliary array application is not required.

Further Topics for the First Alternative

Optionally, the TEE can be enhanced by the FPGA associated computer interacting with a particular hardware component, such as a trusted environment implemented in hardware modules.

Further Topics for the Second Alternative

As scan module 350-2 (being part of FPGA 300-2) is implemented by an on-array processor (hard or soft options), the on-array-processor will execute software. It can be assumed that attackers may inject malicious software to the processor in module 350-2. (This is not the same as the malicious code in FPGA configuration data.) The malicious software may cause some data to leak out (TARGET_CONFIG and decryption keys would be preferred victims).

To mitigate such risks, there are two measures, that can be applied alone or in combination:

The on-array-processor within the scan module can implement a TEE (as described for modules 250-2 and 550-1).

The on-array-processor can be protected by isolation, such as by a security extension.

Optional Features

Having explained a method for configuring the FPGA, the description closes by mentioning some optional implementation features.

The configuration process will be completed within a certain time interval (usually much less than a second, such as a few hundred milliseconds). At the end of the process, [TARGET_CONFIG] (in decrypted form) is no longer required to be available on FPGA 300. It can be deleted (by auxiliary array application 321). [TARGET_CONFIG] can also be deleted if the auxiliary array application fails (to configure the FPGA), such as when an above-explained activity fails. Time-out functions are convenient to use as well, to delete data even if failures are not detected.

Deleting is also applicable to other sensitive data, such as to the keys.

Further, it is possible to encrypt the target configuration data by multiple keys that are different for different activity. For example, [CONFIG_TARGET] in activity 2 (to the TEE) and activity 6 (to the FPGA for configuring) can be based on different keys (and potentially based on different challenge response pairs).

Although the process to remotely configure the FPGA has been described in the context of operating the host computer, the process can also be regarded as a method to operate the FPGA that is installed in the host computer.

Generic Computer System

Figure 12:
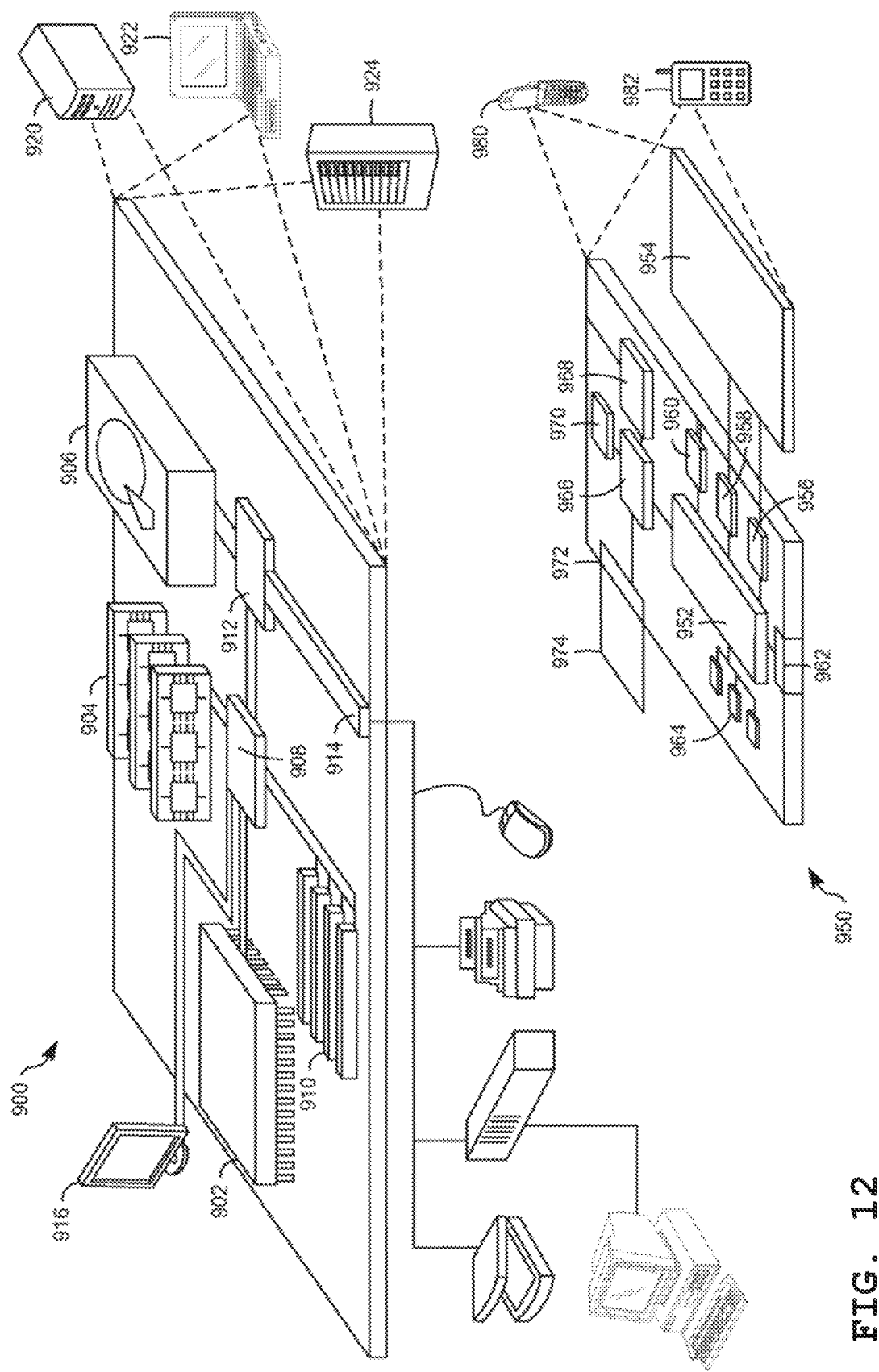
FIG. 12 illustrates a generic computer system.

FIG. 12 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the descriptions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Acronyms

A, B different users in the same role
AES advanced encryption standard
APP application
ASIC application-specific integrated circuits
C challenge
CD configuration data as input to HMAC
CONFIG configuration data for the FPGA, in general
CSP cloud service provider
CPU central processing unit
CRF challenge response function
CRP challenge response pair
ECC built in elliptic curve cryptography
FPGA field programmable gate array
HMAC hash function from a library
HTTPS protocol for secure communication link
I number of CRP for a particular FPGA instance
N number of FPGA instances, by the manufacturer
MEM memory
MDF manufacturer defined function
OS operating system
PUF physical unclonable function
R response
TARGET_CONFIG configuration for the target array application
TEE trusted execution environment
TRNG true random number generator
V value (accessed by the PUF/MDF

REFERENCES

100 computer, configuration computer
121, 122 configuration data
150 network
160 assistance function
170 equipment
175 database (keys)
180 database (CRP)
182 database channel
191, 192, 193 user roles
200 host computer
300 FPGA (installed to host computer)
321 auxiliary array application
322 target array application
350 scanner module (implemented as on-array-processor)
4xx method, and steps
500 support computer
600 FPGA (end of manufacturing)

The invention claimed is:

1. Computer-implemented method for operating a host computer that is communicatively coupled to a configuration computer via a communication network, and that is associated with a FPGA having a fabric area, the method being a method to configure the FPGA to execute a target array application, the method comprising:

the host computer forwarding identity information of the FPGA to the configuration computer, and the host computer receiving target configuration data from the configuration computer in encrypted form, wherein the encrypted form has been prepared by processing a response previously obtained by challenging the FPGA with a challenge;

receiving target configuration data ([TARGET_CON-FIG]) from the configuration computer in encrypted form;

by a scanner module that is connected to the FPGA, decrypting the target configuration data and scanning the target configuration data for malicious code;

for malicious code being absent, writing the target configuration data to the fabric area of the FPGA, thereby configuring the FPGA accordingly, to enable execution of the target array application; and confirming the integrity of the target array application on the FPGA by using the response in an auxiliary array application associated with the host computer, wherein the auxiliary array application causes the FPGA to transmit a proof value to the configuration computer.

2. Method according to claim 1, wherein confirming the integrity of the target array application on the FPGA comprises the following steps:

the configuration computer 100-2 obtaining a nonce and communicating this to a previously installed auxiliary array application, the configuration computer 100-2 calculating a first proof value, the auxiliary array application using the response and the nonce to calculate a second proof value as well;

the auxiliary array application causing the FPGA to transmit the second proof value to the configuration computer;

the configuration computer comparing the first and the second proof values and confirms or denies the integrity.

3. Method according to claim 2, wherein the host computer receives the target configuration data from the configuration computer in encrypted form prepared by processing the response by challenging the FPGA with a challenge response function.

4. Method according to claim 3, wherein the challenge response function is selected from a physical unclonable function and a manufacturer-defined function.

5. Method according to claim 1, wherein the scanner module is related to the FPGA by being implemented as an on-array-processor that is an element of a first part of the fabric area of the FPGA, and the scanner module writes the target configuration data to a second part of the fabric area by writing the target configuration data in decrypted form.

6. Method according to claim 5, wherein the on-array-processor is a processor with a security extension.

7. Method according to claim 1, wherein the scanner module is related to the FPGA through implementation by an FPGA associated computer that runs a trusted execution environment (TEE).

8. Method according to claim 7, wherein the FPGA associated computer that implements the scanner module is selected from the following: the host computer, and a support computer that is associated with the host computer.

9. Method according to claim 7, wherein, prior to writing the target configuration data to the fabric area of the FPGA, the following steps are performed:

obtaining auxiliary configuration data from the configuration computer in non-encrypted form;

authenticating the configuration computer by the FPGA generating a nonce value, sending the nonce value to the configuration computer, and receiving a proof value from the configuration computer made from the nonce value and from the challenge value, and upon successful authentication, configuring an auxiliary array application on the FPGA based on the auxiliary configuration data.

10. Method according to claim 9, with the further step of checking the integrity of the auxiliary array application after the auxiliary array application has been configured.

11. Method according to claim 7, wherein the configuration computer and the trusted execution environment (TEE) communicate the key to decrypt the target configuration data by a secure communication link implementing a key exchange procedure.

12. Method according to claim 7, wherein the configuration computer and the trusted execution environment (TEE) communicate a target configuration key by processing a response that the configuration computer uses to calculate the target configuration key.

13. Method according to claim 12, wherein the auxiliary array application on the FPGA decrypts the target configuration data by the target configuration key.

14. A computer program product for operating a host computer that is communicatively coupled to a configuration computer via a communication network, and that is associated with a FPGA having a fabric area, and for configuring the FPGA to execute a target array application, the computer program product being tangibly embodied on a non-transitory computer-readable storage medium and comprising instructions that, when executed by at least one computing device, are configured to cause the at least one computing device to:

forward identity information of the FPGA from the host computer to the configuration computer;

receive target configuration data from the configuration computer at the host computer in encrypted form, wherein the encrypted form has been prepared by processing a response previously obtained by challenging the FPGA with a challenge;

receive target configuration data ([TARGET_CONFIG]) from the configuration computer in encrypted form;

decrypt, by a scanner module that is connected to the FPGA, the target configuration data;

scan the target configuration data for malicious code;

for malicious code being absent, write the target configuration data to the fabric area of the FPGA, thereby configuring the FPGA accordingly, to enable execution of the target array application; and confirm the integrity of target array application on the FPGA by using the response in an auxiliary array application associated with the host computer, wherein the auxiliary array application causes the FPGA to transmit a proof value to the configuration computer.

15. A system for operating a host computer that is communicatively coupled to a configuration computer via a communication network, and that is associated with a FPGA having a fabric area, and for configuring the FPGA to execute a target array application, the system comprising:

at least one memory including instructions;

and at least one processor that is operably coupled to the at least one memory and that is arranged and configured to execute instructions that, when executed, cause the at least one processor to:

forward identity information of the FPGA from the host computer to the configuration computer;

receive target configuration data at the host computer data the configuration computer in encrypted form, wherein the encrypted form has been prepared by processing a response previously obtained by challenging the FPGA with a challenge;

receive target configuration data ([TARGET_CONFIG]) from the configuration computer in encrypted form;

decrypt, by a scanner module that is connected to the FPGA, the target configuration data;

scan the target configuration data for malicious code;

for malicious code being absent, write the target configuration data to the fabric area of the FPGA, and thereby configuring the FPGA accordingly, to enable execution of the target array application;

confirm the integrity of target array application on the FPGA by using the response in an auxiliary array application associated with the host computer, wherein the auxiliary array application causes the FPGA to transmit a proof value to the configuration computer.

16. A system comprising: at least two processors that are operably coupled to memory and that belong to belong to a host computer and to a configuration computer, wherein the host computer and the configuration computer are communicatively coupled via a communication network, and wherein the host computer is associated with a FPGA having a fabric area, wherein the processors are arranged and configured to execute instructions that, when executed, cause the processor in the configuration computer and the processor in the host computer to:

forward identity information of the FPGA from the host computer to the configuration computer;

receive, at the host computer, target configuration data from the configuration computer in encrypted form, wherein the encrypted form has been prepared by processing a response previously obtained by challenging the FPGA with a challenge;

receive target configuration data ([TARGET_CONFIG]) from the configuration computer in encrypted form;

decrypt, by a scanner module that is connected to the FPGA, the target configuration data;

scan the target configuration data for malicious code;

for malicious code being absent, write the target configuration data to the fabric area of the FPGA, thereby configuring the FPGA accordingly, to enable execution of the target array application; and confirm the integrity of target array application on the FPGA by using the response in an auxiliary array application associated with the host computer, wherein the auxiliary array application causes the FPGA to transmit a proof value to the configuration computer.

* * * * *